(12) United States Patent
Harkness

(10) Patent No.: US 9,349,300 B2
(45) Date of Patent: May 24, 2016

(54) SENIOR DRIVER TRAINING

(75) Inventor: Richard Harkness, Elk Grove, CA (US)

(73) Assignee: LIFELONG DRIVER LLC, Incline Village, NV (US)

(*) Notice: Subject to any disclaimer, the term of this patent is extended or adjusted under 35 U.S.C. 154(b) by 178 days.

(21) Appl. No.: 13/286,210

(22) Filed: Oct. 31, 2011

(65) Prior Publication Data

US 2014/0220513 A1    Aug. 7, 2014

(51) Int. Cl.
G09B 9/04 (2006.01)
G09B 9/05 (2006.01)
G09B 9/00 (2006.01)
G09B 9/02 (2006.01)

(52) U.S. Cl.
CPC .. *G09B 9/05* (2013.01); *G09B 9/00* (2013.01); *G09B 9/02* (2013.01); *G09B 9/04* (2013.01)

(58) Field of Classification Search
CPC .............. G09B 9/05; G09B 9/02; G09B 9/04; G09B 19/16; G09B 19/167; G09B 9/00; G09B 9/052; G09B 19/00
USPC ..................................................... 434/29, 69
See application file for complete search history.

(56) References Cited

U.S. PATENT DOCUMENTS

| | | |
|---|---|---|
| 3,777,413 A | 12/1973 | Zaccheo |
| 3,916,534 A | 11/1975 | Riccio |
| 4,486,180 A | 12/1984 | Riley |
| 4,500,868 A | 2/1985 | Tokitsu et al. |
| 4,750,888 A | 6/1988 | Allard et al. |
| 4,814,896 A | 3/1989 | Heitzman et al. |
| 4,846,686 A | 7/1989 | Adams |
| 4,868,771 A | 9/1989 | Quick et al. |
| 4,939,587 A | 7/1990 | Deslypper |
| 4,952,152 A | 8/1990 | Briggs et al. |
| 5,131,848 A | 7/1992 | Adams |
| 5,184,956 A | 2/1993 | Langlais et al. |
| 5,187,571 A | 2/1993 | Braun et al. |
| 5,209,662 A | 5/1993 | Fujita et al. |
| 5,253,107 A | 10/1993 | Smith |
| 5,275,565 A | 1/1994 | Moncrief |

(Continued)

OTHER PUBLICATIONS

"How is teenSMART Different?" teenSMART, http://www.teensmartdriving.com/how/, Available May 9, 2014, 3 pages.

(Continued)

*Primary Examiner* — Peter Egloff
*Assistant Examiner* — Jerry-Daryl Fletcher
(74) *Attorney, Agent, or Firm* — Amin, Turocy & Watson, LLP

(57) ABSTRACT

A driver training system comprising computerized means for presenting a user of the system with simultaneous footage of a driving environment recorded from cameras directed to four active visual zones comprising a driver's forward view, rear mirror view, and respective left and right side mirror views; computerized means for tracking the driving environment found within the two visual neutral zones comprising a driver's respective left and right blind spots; computerized means for presenting a user with questions regarding events in the footage occurring within the four active visual zones and the two visual neutral zones; and a database for recording responses and response times to the questions or driving challenges requiring a response to the questions; where the forward view comprises a view comprising a view from a camera depicting the view from the windshield combined with a camera depicting the view from the driver's window.

12 Claims, 18 Drawing Sheets

(56) References Cited

U.S. PATENT DOCUMENTS

| | | |
|---|---|---|
| 5,344,324 A | 9/1994 | O'Donnell et al. |
| 5,350,179 A | 9/1994 | Hill et al. |
| 5,366,376 A | 11/1994 | Copperman et al. |
| 5,474,453 A | 12/1995 | Copperman |
| 5,486,112 A | 1/1996 | Troudet et al. |
| 5,499,182 A | 3/1996 | Ousborne |
| 5,613,032 A | 3/1997 | Cruz et al. |
| 5,652,717 A | 7/1997 | Miller et al. |
| 5,660,547 A | 8/1997 | Copperman |
| 5,807,114 A | 9/1998 | Hodges et al. |
| 5,813,863 A | 9/1998 | Sloane et al. |
| 5,828,943 A | 10/1998 | Brown |
| 5,919,046 A | 7/1999 | Hull |
| 5,954,510 A | 9/1999 | Merrill et al. |
| 6,227,862 B1 | 5/2001 | Harkness |
| 6,632,174 B1 | 10/2003 | Breznitz |
| 6,927,694 B1 | 8/2005 | Smith |
| 8,323,025 B2 | 12/2012 | Freund et al. |
| 8,576,286 B1 * | 11/2013 | Childs .................. 348/148 |
| 8,598,977 B2 | 12/2013 | Maalouf et al. |
| 2007/0015117 A1 | 1/2007 | Freund et al. |
| 2007/0072154 A1 * | 3/2007 | Akatsuka ............. G09B 19/16 434/69 |
| 2007/0081262 A1 * | 4/2007 | Oizumi et al. ................ 359/843 |
| 2008/0108022 A1 | 5/2008 | Freund |
| 2009/0011389 A1 * | 1/2009 | Sizov .............................. 434/66 |
| 2009/0181349 A1 * | 7/2009 | Harkness ........................ 434/69 |
| 2011/0076650 A1 * | 3/2011 | Best et al. ...................... 434/69 |

OTHER PUBLICATIONS

"teenSMART," ADEPT Driver, http://www.adeptdriver.com/products/teensmart/, Available May 9, 2014, 3 pages.

"What makes teenSMART successful?" teenSMART, http://www.teensmartdriving.com/what/, Available May 9, 2014, 3 pages.

"Why be a teenSMART Driver?" teenSMART, http://www.teensmartdriving.com/why/, Available May 9, 2014, 2 pages.

Berry, B., "ADEPT Driver Launches New Version of teenSMART to Kick Off National Distracted Driving Awareness Month," www.adeptdriver.com, Apr. 10, 2014, 2 pages.

International Search Report & Written Opinion for International Patent Application Serial No. PCT/US09130765, dated Apr. 30, 2009, 6 pages.

Office Action for U.S. Appl. No. 11/972,512, dated Jul. 12, 2011, 17 pages.

Office Action for U.S. Appl. No. 11/972,512, dated Nov. 13, 2014, 36 pages.

Office Action for U.S. Appl. No. 11/972,512, dated Jul. 6, 2015, 32 pages.

Office Action for U.S. Appl. No. 14/563,182, dated Apr. 9, 2015, 16 pages.

Office Action for U.S. Appl. No. 14/563,182, dated Jul. 8, 2015, 15 pages.

* cited by examiner

SENIOR DRIVER TRAINING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files and records, but otherwise reserves all other copyright rights.

BACKGROUND OF THE INVENTION

1. Field of the Invention

The present invention relates to systems and methods for assessing and training automobile drivers, and in particular, driver with potential driving impairments.

2. Description of Related Art

In the decade and a half from 1990 to 2007, the number of seniors (over the age of 65) in the population increased by 21% (from 31.2 million to 37.8 million). The number of seniors over the age of 85 increased during that same time period by 81% (from 3.1 to 5.6 million). And, it is this latter group that has such an elevated risk of collision, especially of fatal collision.

In the next few decades the growth in the senior population is expected to escalate very dramatically. By the year 2030, the population of seniors over the age of 65 will have increased by 89% since 2007 (from 37.8 million in 2007, to 71.5 million in 2030); during that same timeframe, the population of seniors over the age of 85 will have increased by 71% (from 5.6 million to 9.6 million).

Commensurate with the growth in the senior population, the number of them who are licensed drivers has also increased. From 1990 to 2004 (the most recent year for which licensing data are available), the number of licensed drivers over the age of 65 increased by nearly 30%, from 22 million in 1990 to almost 29 million in 2004. Even greater increases have occurred in the number of licensed drivers age 85 and over—an increase of 79%, from 1.4 million in 1994 (first year data reported) to 2.5 million in 2004.

In fact, the population of licensed senior drivers is growing at a faster pace than the population of seniors themselves. This means that more and more seniors are becoming licensed or retaining their license. In 1990, 71% of seniors age 65 and over were licensed to drive, but by 2004 this had risen to 80% —a 13% increase. Among seniors over the age of 85, the increase has been even more pronounced—in 1994 (data prior to that year are not available), 40% of seniors over the age of 85 were licensed; by 2004 that figure had risen to 50% (a 25% increase in the licensing rate in a decade).

In 2004, the most recent year for which statistics are available, 6,199 drivers over the age of 65 were involved in fatal road crashes in the United States; another 270,000 were involved in injury collisions, and 806,000 were involved in property-damage only collisions. These numbers alone are cause for concern but the importance of the problem is underscored by the fact that, on a mile-for-mile basis, senior drivers are overrepresented in road crashes. Generally, crash rates are very high among teens, decline with increasing age, and then increase again with advancing age. The oldest senior drivers, those age 85 and over, have a crash rate that is almost 4 times higher than that of middle-age drivers and even rivals that of teens.

The elevated crash rates among senior drivers are even more apparent if only fatal collisions are considered. Drivers age 85 and over have a per-mile fatal crash involvement rate that is 16 times that of drivers age 40-49 and even 2 times that of drivers age 16-19. In this regard, it has been argued that the sharply elevated risk of fatal collision among seniors is due in large part to their frailty—as a consequence, seniors are more likely than younger drivers to die or be seriously injured in a crash of equal severity. This suggests that the increase in "fatal" crash risk with advancing age does not necessarily mean that senior drivers are "more dangerous" than younger ones but that they are more likely to be killed in the collisions in which they are involved.

This last point speaks to the importance of efforts that will prevent collision involvement among seniors as well as to those that reduce injury severity—e.g., encourage senior drivers to buy safer cars and to always wear their seat belts.

The fact that senior drivers have an elevated crash risk highlights the need for effective measures that will reduce their likelihood of a collision. This need has become more urgent in recent years. Shifts in demographics and lifestyle have resulted in more seniors in the overall population, a growing proportion of seniors being licensed to drive, more of them continuing to drive, and annual miles driven increasing at a faster rate for seniors than for any other age group.

Various techniques, systems and methods are available for providing driver education and training. Most driver training systems and methods employ actual, behind the wheel driver training as at least one component. Such driver training may or may not be supplemented with classroom instruction.

Also known are driving simulators in which images are displayed on a display device. In such simulators a steering wheel, brake and accelerator are typically connected in a feedback loop and under computer control the image displayed varies as a function of the driver's operation those components. Additional views, such as left side views, right side views and rear views may be provided within separate windows on the display device, or using separate display devices for views in addition to views simulating a forward view.

In United States Patent Application No. 20090181349, a driver training system is presented in the form of a computerized assessment system is described for diagnosing driving skills in a driver of the class of vehicle drivers having impaired abilities, such as a senior driver. The system utilizes prerecorded audio/visual training sessions for diagnosing the visual cognition, visual memory and visual recall abilities of a motor vehicle driver with interactive driving simulations presented through four active visual zones, representing a forward view, a rear view mirror view and the view representing both side view mirrors. That system was presented as providing a tool for rehabilitation of drivers having impaired abilities through visual cognition tests involves full motion driving simulations to assess visual search skills. Visual memory and visual recall of the senior driver are also assessed.

United States Patent Application No. 20100041001, discloses an attention training system that is said to improve driving skills in older citizens, by addressing the conditions of divided attention related to the Useful Field of View (UFOV). Reduced UFOV performance in older adults is said to be associated with poorer driving performance and more auto accidents. The positive consequences of the general UFOV training-induced performance improvement are said to include improved health-related quality of life outcomes and improved ability to perform activities of daily living. Participants are required to select a target image from among numerous candidate images. If the participant correctly selects the first target image, the participant is required to select the first peripheral location from the multiple peripheral locations. The presentation time is adaptively modified based on the correctness/incorrectness of the participant's selections. While the process is said to improve a participant's cognition, it does not present to the user an assessment that resembles a driving environment.

As important as such systems may be to the general goal of senior cognition, or even the goal of improved driving skills, any driving system geared to seniors must be able to provide them with concrete tools to improve actual driving performance. The social situation, driving skills and abilities, and general effects of the aging process mean that the causes of senior crashes are very different than that of a younger population, and will require different approaches to impact crash reduction. It would be desirable, then, to have a science-based senior driver program specifically designed to reduce collision rates, and thus extend the freedom of mobility for older drivers.

These and all other publications, patents and applications referenced below, are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

SUMMARY OF THE INVENTION

These and other features and advantages of this invention are described in, or are apparent from, the following detailed description of various exemplary embodiments of the apparatus and methods according to this invention.

A driver training system is disclosed that provides computerized means for presenting a user of the system with simultaneous footage of a driving environment recorded from cameras directed to four active visual zones comprising a driver's forward view, rear mirror view, and respective left and right side mirror views, where the forward view comprises a view comprising a view from a camera depicting the view from the windshield combined with a camera depicting the view from the driver's window. The system further uses computerized means for tracking the driving environment found within the two visual neutral zones comprising a driver's respective left and right blind spots, and computerized means for presenting a user with questions regarding events in the footage occurring within the four active visual zones and the two visual neutral zones. A database records responses to the questions.

In a further embodiment, the invention provides a system where the forward view provides a view of at least about 130 degrees of the driving environment within the driver's forward view.

In a further embodiment, the invention provides a system where the forward view further comprises a view from a camera depicting the view from the passenger's window.

In a further embodiment, the invention provides a system where the forward view provides a view of at least about 175 degrees of the driving environment within the driver's forward view.

In a further embodiment, the invention provides a system where the simulated driving session includes at least one presentation requiring the driver to act in response to a driving environment presenting a response required to a gap in the flow of traffic.

In a further embodiment, the invention provides a system where the time of the response is recorded and calibrated to safe, risky and unsafe scores.

In a further embodiment, the invention provides a system where the score of safe requires a simulated gap of four or more seconds for taking a left turn driver action across traffic.

In a further embodiment, the invention provides a system where the score of unsafe involves a simulated gap of less than three seconds for taking a left turn driver action.

In a further embodiment, the invention provides a system where the score of risky involves a simulated gap of between three and four seconds for taking a left turn driver action.

In a further embodiment, the invention provides a system where the flow of traffic comprises is that presented by a traffic circle environment.

In a further embodiment, the invention provides a system where the flow of traffic is that presented by a left turn into oncoming traffic.

In a further embodiment, the invention provides a system where the flow of traffic is that presented by a T-stop environment.

In a further embodiment, the invention provides a system where the flow of traffic is that presented by a merge onto a freeway.

In a further embodiment, the invention provides a system where the flow of traffic is that presented by a merge into an adjacent lane of traffic.

In a further embodiment, the invention provides a system where the forward view comprises a pannable view.

In a further embodiment, the invention provides a system where the pannable view may be manipulated by the user by means of a graphical user interface.

In a further embodiment, the invention provides a system where the graphical user interface shifts the pannable view left and right in response to the user's head motion.

In a further embodiment, the invention provides a system where the view pans automatically.

In a further embodiment, the invention provides a system where the driving environment presentation is variable in complexity.

In a further embodiment, the invention provides a system where the complexity varies depending on traffic density.

In a further embodiment, the invention provides a system where the complexity varies depending on traffic speed.

The invention also provides a driver training system comprising computerized means for providing a user of the system with a presentation of a driving environment recorded from cameras directed to four active visual zones comprising a driver's forward view, rear mirror view, and respective left and right side mirror views; computerized means for tracking activity within the four active visual zones and within two inactive zones representing respective driver blind spots; and computerized means for digitally assessing driver actions in response to simulated driving situations presented by the presentation; where the simulated driving situations requires the user to account for at least three targets within the four active visual zones and the two inactive zones.

In one embodiment, the up to fifteen targets are presented in an exercise presenting a series of gaps in traffic.

In a further embodiment, the invention provides a system where the computerized means assess the time of response for the driver actions.

In a further embodiment, the invention provides a system where the computerized means assess the accuracy of response for the driver actions.

In a further embodiment, the invention provides a system where the situation includes at least one presentation requiring the driver to identify a traffic hazard.

In a further embodiment, the invention provides a system where the situation involves the driver taking an action to identify an object of interest or potential hazard.

In a further embodiment, the invention provides a system where the object of interest or hazard is a traffic signal.

In a further embodiment, the invention provides a system where the object of interest or hazard is a pedestrian.

In a further embodiment, the invention provides a system where the object of interest or hazard is a vehicle.

These and other features and advantages of this invention are described in, or are apparent from, the following detailed description of various exemplary embodiments of the apparatus and methods according to this invention.

BRIEF DESCRIPTION OF THE DRAWINGS

A more complete understanding of the present invention and the attendant features and advantages thereof may be had by reference to the following detailed description when considered in conjunction with the accompanying drawings wherein:

FIG. 5 is a screen shot of the presentation made to the driver for evaluating gaps in both left and right hand cross traffic required while addressing a left hand turn at a T intersection.

DETAILED DESCRIPTION OF THE INVENTION

Figure 1:
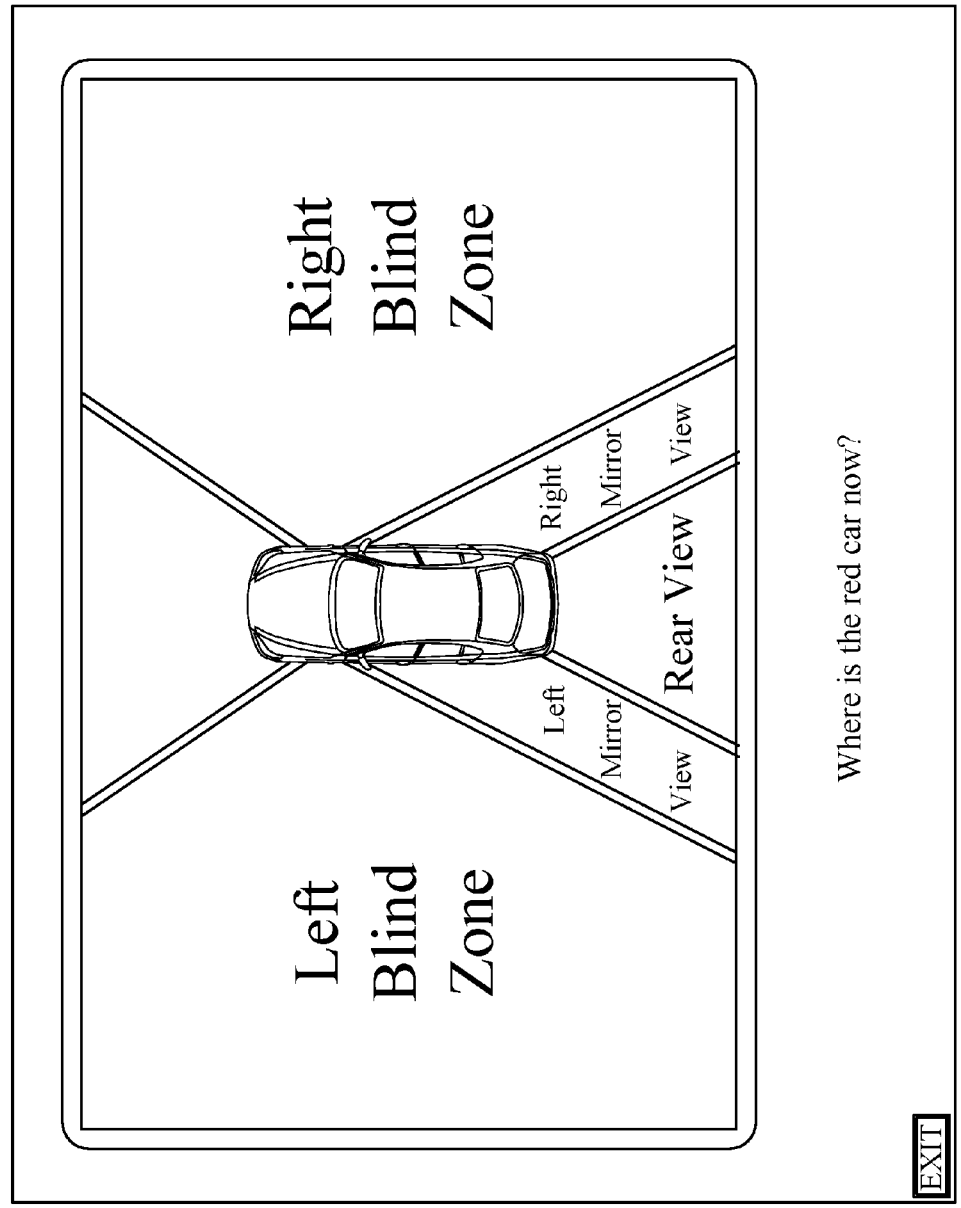
FIG. 1 is a diagram setting forth the components of a prior system for presenting four visual zones to a driver in a simulated driver assessment.

With the aging of the baby boomers, and the increasing life expectancy, aging drivers have become an issue of greater and greater concern to society. The present invention provides a system and method for providing driver training and education that is adapted to address the areas of greatest concern encountered by senior citizens, which is designed using the most current scientific studies of the driving issues affected seniors.

Epidemiology studies were consulted to determine the causes of older driver crashes. A three year study was undertaken to review the literature on the cause of accidents with senior drivers. The analysis revealed key skill and knowledge areas that highly correlate with older driver crashes.

Based on this study, critical psychomotor, cognitive and sensory and perceptual content was identified as necessary for a program to provide effective behavioral intervention.

The primary road safety issues for the senior driver all related to certain critical areas. These included the issues of determining safe gaps, such as those encountered when making left turns at controlled and uncontrolled intersections, managing traffic circles, and making merged entries to traffic and lane changes.

Other critical issues related to visual cognition and memory of what is in the driver's blind spots, mirrors and in front of the driver. This relates to the issue of hazard detection, which is particularly highlighted where there are issues of divided attention, such as are found at busy intersections and in parking lots.

Various nationally recognized experts were consulted, including doctors and scientists who have specialized in older driver issues. These experts covered the fields of neurology and gerontology, traffic safety research, instructional technology, psychometrics, psychology of aging and occupational therapy. They were able to evaluate and enhance the original report.

With this in hand, psychometric design and instructional technology were utilized in developing a series of psychometric driving simulations that directly address the target areas most associated with older driver crash involvement. Psychometrics is the field of study concerned with the theory and technique of psychological measurement, which includes the measurement of knowledge, abilities, attitudes, personality traits, human factors assessments and educational measurement. The field is primarily concerned with the construction and validation of measurement instruments, such as questionnaires, tests, and personality assessments. In designing and effective senior driver assessment system; a number of factors were considered. The resulting training system keys in on those skills and driving situations of greatest concern to seniors.

Issues with Senior Drivers

Research has consistently found that senior drivers have proportionally more crashes during the day than middle—aged drivers or young drivers. Some 80-90% of all the collisions of senior drivers have been shown to occur during daylight hours, compared to 60-70% of the collisions of other drivers. Casualty collisions involving seniors are about twice as likely to occur during daylight hours as those of younger drivers. The extent of this over-involvement increases with advancing age for crashes of all levels of severity.

Senior drivers are also more likely to be involved in collisions related to specific actions and roadway locations—e.g., crossing maneuvers at intersections and the like.

Senior drivers, particularly those 80 and over, are also more involved than younger drivers in collisions with a speed ratio (the estimated crash speed as a percentage of the speed limit) that is 30% below the posted speed. In other words, they tended to be more involved in collisions where they were driving below the speed limit.

Investigations have also consistently found that the most common error made by senior drivers is failure to yield the right-of-way. And they have also been shown to make this error more often than younger drivers. Research suggests this problem arises from perceptual and attention problems as well as misjudgments.

Moreover, such difficulties increase with advancing age.

Also of interest are inattention and misjudgment errors. These were found to be more prominent in the collisions of senior drivers than those of younger drivers. Inattention is defined as "when there is a breakdown in the intake of visual and other information" and misjudgment is defined as "miscalculations of time, distance, and speed".

The proportions of crash-involved senior drivers identified as inattentive and as having made a misjudgment error increased with advancing age. Twenty eight percent of senior drivers (aged 65-74), 36% of those aged 75-84, and 41% of those aged 85 and over were identified as inattentive before their collision, compared to only 24% of middle aged drivers (35-44). Among senior drivers aged 65 and over, females were slightly more likely to exhibit inattention than males (32.1% versus 29.9%).

Misjudgment was cited for 17% of senior drivers aged 65-64 involved in collisions, 22% of those aged 75-84, and 22% of the oldest seniors age 85 and over, compared to only 12% of drivers aged 35-54. No difference in misjudgment was found between senior male drivers and senior female drivers.

Inattention and misjudgment errors were also found to be more characteristic for senior drivers (aged 65 and over) in different crash situations. In this regard, 30% and 18%, respectively, of all collisions of senior drivers involved inattention and misjudgment errors. By comparison, 33% and 20% of their collisions occurring at intersections involved inattention and misjudgment. The crash factors or conditions associated with higher proportions of inattention and misjudgment than was the case in all collisions are listed on the next page—e.g., inattention was a factor in 30% of all their crashes, compared to 65% of the crashes in which the senior driver's vehicle struck the back of another driver's vehicle (rear-ender). The findings below suggest that inattention was more closely associated with senior drivers who caused the collision by colliding with another vehicle than with those in vehicles which were struck by others—e.g., inattention was more often identified among rear-enders, in which the senior driver was in the striking vehicle, than among the rear-enders, where the senior driver was in the vehicle being struck from behind.

Senior drivers have been found to be over involved in a number of different types of collisions. Collisions arising from overtaking, merging, and lane changing have been shown in the literature to be more common among senior drivers, relative to middle-aged and younger drivers.

Also, a substantial proportion of the multiple-vehicle collisions involving senior drivers occur at an angle, particularly at right angles or "broadside". All the studies show that senior drivers are overrepresented in such crashes, relative to other drivers. In these studies, about one-quarter to as many as a third of the crashes of younger drivers involve angle collisions, compared often to half or more of the crashes of seniors. Most studies also found that increases in age were systematically related to an increase in the proportion of angle collisions. In at least one study, angle collisions have been shown to be more characteristic of senior female drivers, who were also more likely to be in the striking vehicle.

Not surprisingly, investigations have consistently shown that senior drivers are overrepresented in collisions that involve some turning maneuver, particularly a left turn and especially a left turn at an intersection. A review of these studies suggests that from 20% to 35% of the collisions of senior drivers involve turning maneuvers, particularly left turns, and that seniors are typically 2 to 3 times more likely to be involved in a turning crash than are younger drivers. Such research has shown that senior drivers are overrepresented in collisions at virtually all types of intersections—urban and rural signalized intersections, and urban and rural stop-controlled intersections as well as at uncontrolled intersections.

Senior drivers are often found to be in excess of two times more likely than young drivers to be involved in an intersection crash. This is especially the case for the "oldest" senior drivers (aged 80 or aged 85 and over). There is also evidence that for senior drivers intersections during darkness are more risky than intersections during the day; intersections in rural areas have been found to be more risky than those in urban areas. Research also suggests that senior drivers are overrepresented in crashes at non-signalized intersections more so than in crashes at signalized intersections The studies also show that it was the senior driver who was making the turning maneuver and was more likely to have failed to yield or to have disregarded the traffic signals. In at least one intersection study, the presence of passengers was found to have a protective influence in that passengers in the vehicle of the senior driver reduced their odds of being involved in a left-turn crash and a gap-acceptance crash.

Age Related Factors Related to Driving

Age-related visual declines have been found to reduce driving performance and/or are associated with senior driver crashes include: less efficient visual search, reduced visual acuity, less sensitivity to light and reduced dark adaptation, reduced ability to adjust focus, increased susceptibility to glare and slower glare recovery, declining contrast sensitivity, and loss of visual field and peripheral vision.

Ageing also results in slower eye movements and, consequently, less efficient visual search of the driving environment. There is evidence of age-related declines in abrupt, saccadic eye movements—movements of short duration and high velocity designed to move an image onto the fovea (the central retinal area that produces the sharpest visual image). The deterioration results in an increased latency to initiate saccadic movements, a slower velocity in the saccadic movement itself, and more saccadic movements to fixate an image on the fovea. This means it takes older adults longer to locate objects—e.g., a traffic sign—in the visual scene.

Older persons also experience declines in pursuit eye movements, which are of long duration and relatively slow velocity and serve to keep an image on the fovea when the person or object is in motion. The effects include slower pursuit velocity and decreased latencies for the onset of pursuit movements.

Ageing has also been found to restrict the maximum extent of upward and downward gaze without head movement, which means that older persons are more likely to have to rely on head movement to change where they are looking, rather than to move only their eyes from one object to another.

Visual acuity is the ability to perceive spatial detail in objects at a given distance, and is needed to discriminate high-contrast features—e.g., for reading information on road signs. It is typically divided into static and dynamic visual acuity. Static visual acuity is the ability to resolve or observe stationary details; dynamic visual acuity is the ability to observe, and resolve details when there is relative motion (e.g., a moving object or the subject is moving towards a stationary object).

Research shows that both static and dynamic visual acuity deteriorates with age, though dynamic acuity deteriorates more rapidly. Dynamic acuity for a moving target also decreases with an increase in target velocity and is better when the target is fovea (central) rather than peripheral. Moreover, with advancing age, visual acuity becomes increasingly impaired under reduced illumination. Although visual acuity can be improved with corrective lenses and increased illumination, it often does not achieve optimal levels of 20/20.

The ability to focus on proximal objects as well as the speed with which the eye can accommodate to objects at different distances becomes more problematic with increasing age. This results in a reduction in visual resolution of detail, and this is especially the case when focusing on objects or details that are close. This has obvious relevance for safe driving because of the need to focus rapidly and clearly on objects at different distances when negotiating a moving vehicle.

The visual field refers to the visual space over which vision is possible with the eyes held in a fixed position The visual field includes central and peripheral vision. The visual field shrinks as people age, producing increasing insensitivity to objects or targets in the periphery. Optometrists use diagnostic tests to assess central and peripheral vision in their patients. Typically these tests involve presenting the patient with small flash of a dot or wiggling dash, and the patient is asked to press a button each time it appears on a screen. The persons chin rests on a mount the subject's looks into a covered eye piece that focuses on the display inside a box. The functional area of the visual field is represents the field of visual awareness. Three sub-tasks comprise such a test: visual processing speed, processing speed with divided attention, and selective attention. It is possible for someone to have an excellent visual field but still have a diminished ability to perceive and recognize incoming stimuli because of a reduced field of visual awareness. While important, such considerations alone are not completely applicable to the issues of navigating the driving environment, as it does not take into consideration the importance of monitoring traffic, mirror adjustment and visual search while driving or spotting hazards.

Cognition encompasses all the higher-order mental processes of thinking, decision-making, judging, imagining, problem-solving, categorizing, remembering, attending, and reasoning. Functions such as these are obviously important to safe and collision-free driving. As noted in previous sections, sensory functions, particularly vision, are important because the vast majority of information needed for driving is visual in nature. But being able to see is only part of the equation; perceptual processes that give meaning to the visual cues are important as well, for example, recognizing that the visual input is a child standing on the curb at the side of a road. At the cognitive level, such information receives even further elaboration and refinement in the context of previous experiences, for example, recognizing that such a situation can, or has in the past, resulted in a risky situation as well as assessing the level of risk it poses; i.e., what is the likelihood that the child will dart into the traffic stream?

Any deterioration in cognitive functions, either in terms of their capacity or speed of operation, can have implications for safe driving. Given the importance of cognition to driving, it is perhaps not surprising that older drivers encountering problems with their cognitive capacities, regardless of the cause, experience driving problems and elevated crash risk. Studies have typically found that senior drivers with cognitive impairments are at least twice as likely to be involved in a crash.

Ageing results in generally slower decision-making about what response is appropriate Slower decision-making may disrupt visual search and sequencing abilities, making it difficult to identify, track, and react to hazards in a dynamic driving environment.

Research has shown that functional abilities related to vision, perception, cognition and motor performance generally decline as a normal consequence of ageing. Declines in some aspects of these functions have also been found to adversely affect driving performance and contribute to the collisions of senior drivers.

For some seniors, age-related changes are dangerous because the senior may not always be aware that their functional abilities are declining and that these changes are placing them at increased risk of collision. On a positive note, if seniors are aware of these problems, some self-regulate their driving and adopt compensatory behaviors. Some compensatory behaviors, however, are not necessarily the correct ones to reduce crash risk—e.g., driving more slowly on an expressway.

Senior Driver Training

The present system utilizes the ability to present a more realistic driving presentation to the user to specifically train and assess the senior driver's abilities in concrete ways. The present systems and methods engage the senior learner in a fashion designed to maximize learning efficiency and increase driver retention of the learning's. The learning's are reinforced to impact behavioral change and habit formation in the driver.

In addition to the literature, older driver focus groups were employed to evaluate and fine tune the instructional technology, computer functionality, key board and mouse functionality, etc., of the system. Two prototypes were built and tested and modified before final version psychometrics were initiated, during which period many enhancements were made.

Figure 2:
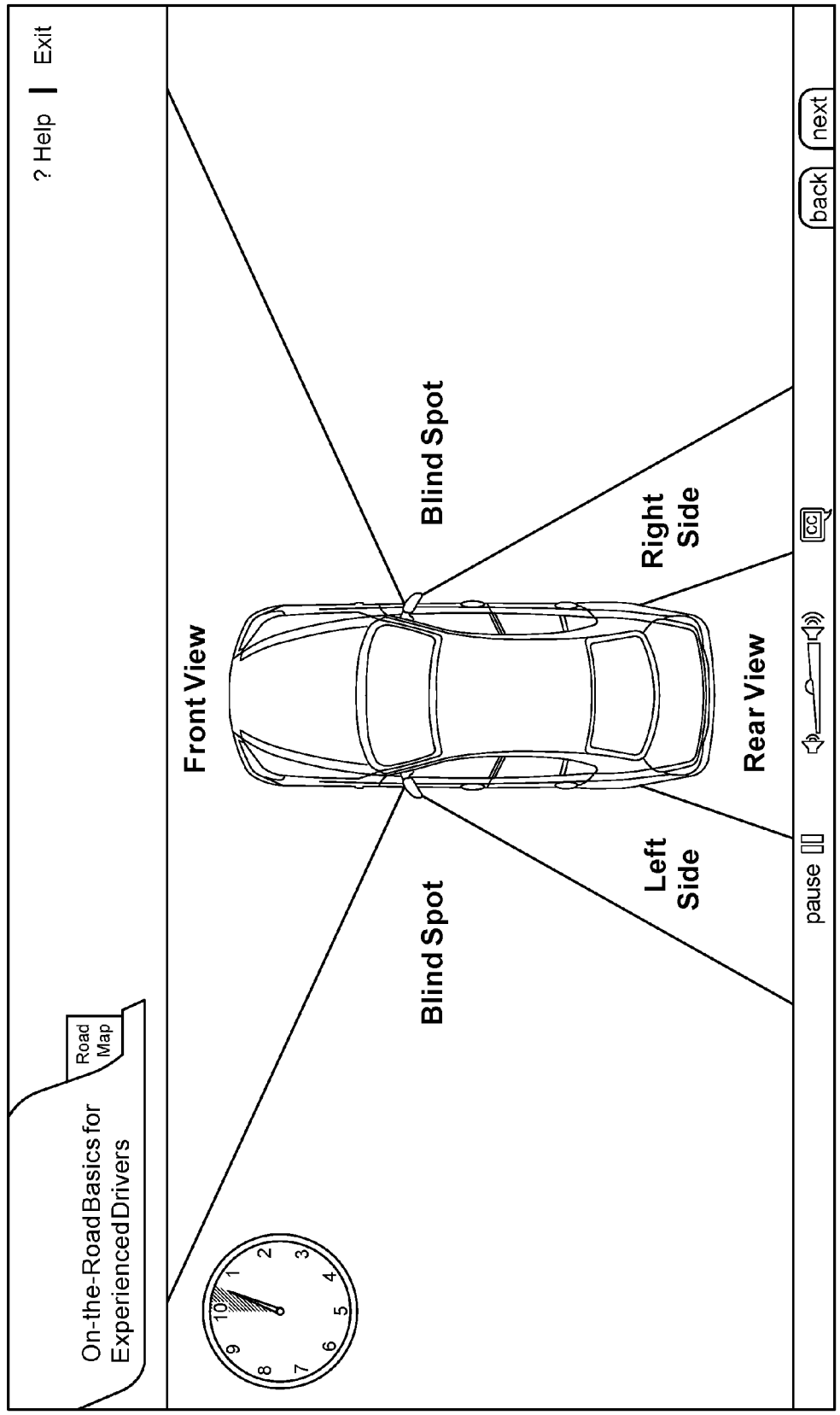
FIG. 2 is a diagram setting forth the extended components of the present system when using a two-camera stitch.
Figure 3:
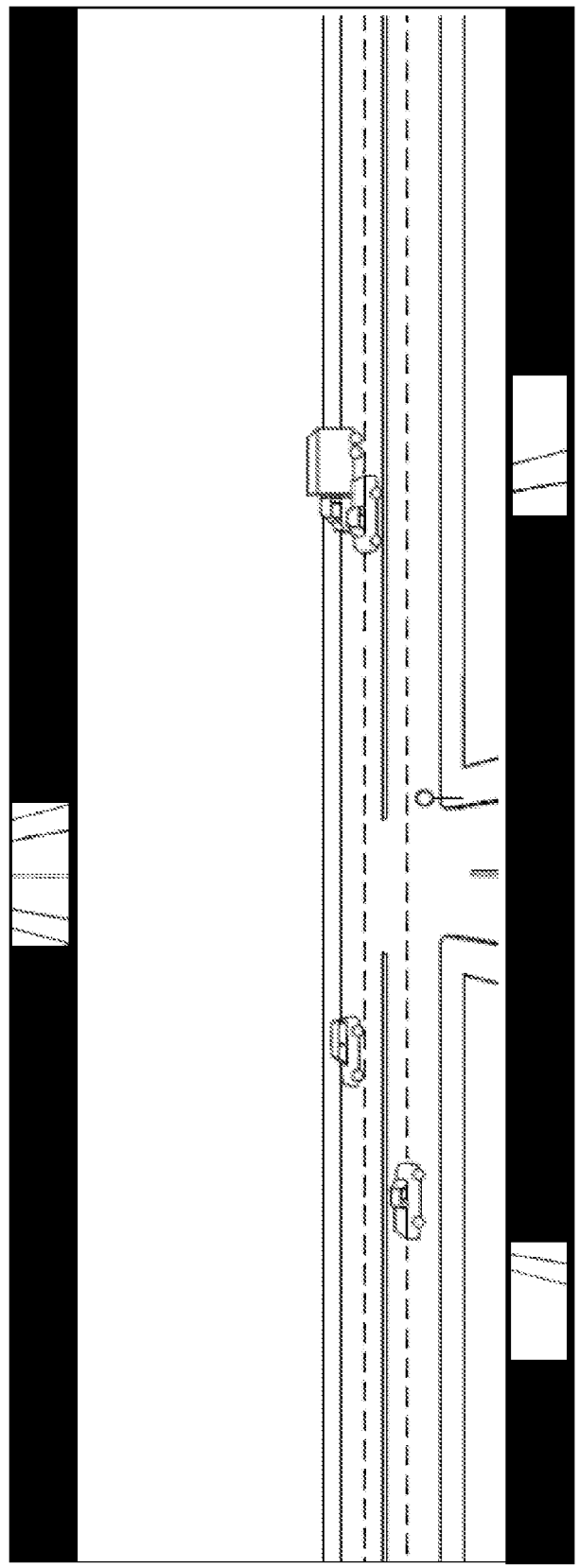
FIG. 3 shows a screen shot taken from a presentation made to the driver that is from a recorded driving situation, providing a 175 degree pannable field of view.

The system employs a new video capture technology of the driving environment, using high definition for clarity and contrast sensitivity assessments, as well as added response time assessments capable of measurements up to $1/30$ of a second. The video capture technique uses up to three cameras to capture a front driver view with a nearly 180 degree field of vision. FIG. 1 is a diagram showing the components of a prior system that presented four visual zones to a driver in a simulated driver assessment. FIG. 2 shows the extended components of the present system based on technology that allows for seamless stitching of multiple camera images recorded from a front camera and side cameras directed to capture the driver and passenger window views. As depicted in FIG. 2, this provides an approximately 120 degree full motion combination front view, though adjustments to the cameras can be made to provide greater or lesser angled views, as deemed necessary for the exercise. Views approaching 180 degrees are about as great as are practically necessary for most simulations. FIG. 3 shows a screen shot taken from a presentation made to the driver that is from a recorded driving situation, providing a 175 degree pannable field of view.

The expanded field of view is necessary to present certain driving situations that are particularly important to senior training and assessment. The new techniques integrate high definition 6 camera images and compression, with three cameras stitching into a pannable front view, along with cameras for the two side mirrors and rear view mirror. Designing a graphic user interface that allow for the 6 camera functionality, in some ways similar to I-max surround video, allows a psychometric assessment of gap analysis, visual cognition and hazard detection/divided attention in senior driver education.

The resulting systems is able to record simultaneous footage of a driving environment from cameras directed to four active visual zones comprising a driver's forward view, rear mirror view, and respective left and right side mirror views, but where the forward view comprises a composite expanded view. The expanded view is developed from a camera depicting the view from the windshield combined with a camera depicting the view from the driver's window. In this expanded view, driving events can be evaluated and assessed that are not presentable from a recording from a single forward facing camera.

The system uses computerized means for tracking the driving environment found within the two visual neutral zones comprising a driver's respective left and right blind spots, and computerized means for presenting a user with situations from simulated driving environments.

The senior driver is finally presented with questions regarding events in the footage occurring within the four active visual zones and the two visual neutral zones. A database records responses, and response times, to the questions.

In every simulation, a driving simulation is played and then flashed to a graphic six zone screen that covers the driving scene.

Where the method also assesses hazard detection skills of the senior drivers, the simulated driving situation requires the user to account for at least three targets simultaneously for visual cognition and memory tests, although this may be adapted for different users and driving environments. One to three may be appropriate for some users for freeze frame visual cognition and memory tests within the four active visual zones and the two inactive zones. The test taker is presented a full motion driving scenario and clicks on to hazards as they appear during the driving scene. Typically, the test taker will have to respond in a timely manner to get credit on hazard identification. This test measure response times of the test taker as part of the assessment, measured digitally and timed by the system apparatus. Reaction times are something particularly critical to assessing the abilities of senior drivers to the simulated driving situations.

One to as many as twenty hazards may be presented, however, when assessing gap analysis against cross traffic or merging into flows of traffic.

For the senior driver, presenting a plurality of hazards is important, as the diminishment of the cognitive abilities of cognition, visual awareness and spatial memory are all utilized in tracking multiple objects and events in the driving environment, such as vehicles, pedestrians and traffic signals.

The system employs and utilizes various computerized means for presenting and recording the resulting actions of the driver. The system will include a computer program to present the at least one prerecorded audio/visual training session, with recording means for diagnosing the visual cognition, visual memory and visual recall abilities of a driver.

The four active visual zones will typically be presented to the driver by the use of computerized means for digitally assessing driver actions in response to simulated driving situations presented by the interactive driving simulations. Response times, accuracy, and the number of missed opportunities are all assessed and recorded.

A driving scene is typically presented showing the four fields in a split screen system on a computer screen, which is then stopped before switching to a zone graphic with a question. The visible zones in the four camera field of view include the expanded forward zone, which includes everything visible through a windshield in driving, and occupies the full computer screen except the spaces reserved for the three small rectangular shaped images that appear to have a chrome border.

A left side mirror zone is provided in a chrome framed rectangular image in the lower left hand corner of the screen. The right side mirror zone is a chrome-framed rectangular image in the lower right hand corner. A rear mirror zone is shown as a chrome framed rectangle in the upper center of the screen. Each mirror zone depicts its own scene recorded simultaneously with the main screen windshield view.

The right blind spot zone is everything to the right of the car that cannot be seen in the front view, rear view or right side mirror zones. The left blind spot represents the zone to the left of the car that cannot be seen in the front view, rear view or left side mirror zones.

Objects are constantly moving in and out of these blind spots during the full motion video scenarios, just as in real world driving. The presentation of real world transitions among and between visible and blind spot zones permits a series of questions to be asked of the simulation driver. The driver at all times is expected to track and to know what is in the blind spots, and what is not there.

For example, if asked "Where is the white pickup truck now?" and the truck was slowly passing on the right and had just disappeared from the right rear mirror, the driver would respond; "in the right blind spot zone", even though the truck is not presently visible on the computer screen. Another possibility would be to ask the test taker "where is your escape path now?" If there had been no cars drifting in or out of the blind spot or right rear view mirror or ahead and immediately to the right then the driver could assume the right blind spot zone was clear and would most likely make for good escape path if needed at the moment.

The system may also be designed to assess the abilities of the driver relating to lateral search, risk perception, speed adjustment, space management, and hazard recognition.

As another feature of the method and system of driver assessment is the creation of a database that records driver actions. This database is used in developing a diagnostic assessment of the visual cognition, visual memory and visual recall abilities of the driver. Preferably, the system employs unobtrusive psychodiagnostic methods in the diagnostic assessment as part of the measurements taken of driver reactions and response times. Features built into the software make calculations that measure ability, progress and improvement, as well as allow for adaptive learning and artificial intelligence to occur.

Another computer program is employed that is capable of developing a diagnostic assessment of the visual cognition, visual memory and visual recall abilities of the driver based on the recorded driver actions.

The use of digital frame based technology allows precise timing and very accurate comparisons of reactions that are made by the driver to the simulations presented by the system, and digital frame based technology is preferred for use with the system. Current digital camera and digital motion technologies are capable capturing a minimum of 720 by 485 pixels of data per frame, and at 30 frames per second. Alternatively, more traditional streaming video can be used with the system.

Different environments and assessments are used to address the common issues seniors have in the timing of traffic actions, such as in crossing oncoming traffic, and merging. In this context the expanded forward camera is particularly important, as many of the situations that are most problematic to seniors are those that involve the timing of gaps in oncoming traffic. Many of these "gap analysis" situations occur with traffic passing toward and past the driver car from various angles. A panning option, or even auto panning functionality, is critical for such an evaluation. Presentations are shot in urban, suburban, rural driving environments, and are captured in varying lighting conditions, including, glaring, normal, dusk, shadowy, bright clear, rainy, diminished contrast sensitivity, enhanced contrast sensitivity, etc.

In the training system, the panning functionality is also linked to unique and proprietary computer software that measures real time responses and provides instant feedback to the user. This allows data tracking and reporting software to capture and report performance as well as competency for certification, for instance, to an insurance discount program.

In some cases the pannable view may be manipulated by the user by means of a graphical user interface, for instance, to shift a view left and right in response to the user's head motion. Alternatively, in other cases the view may be panned automatically for the senior driver.

Figure 4:
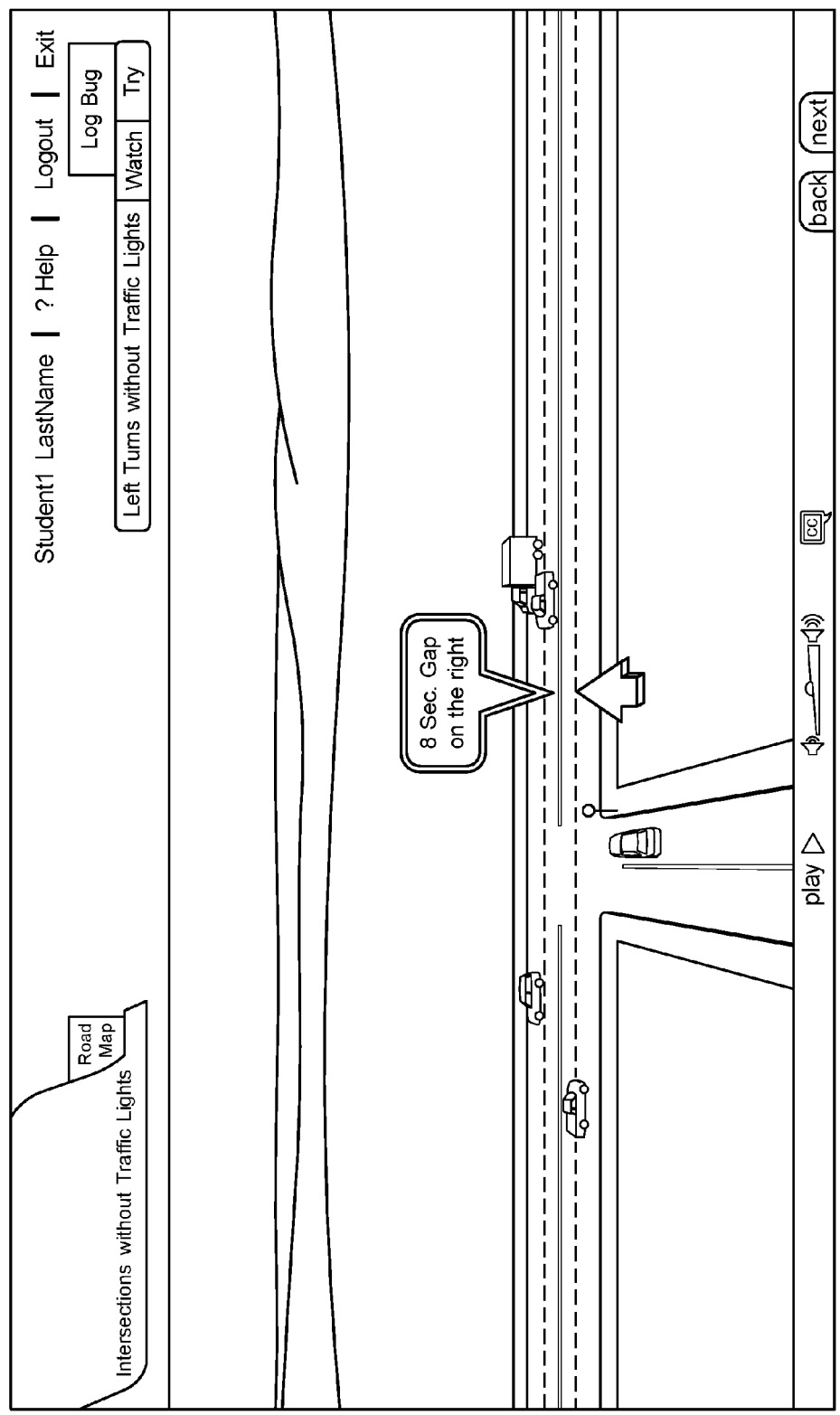
FIG. 4 is a screen shot showing a graphical demonstration of the safe six second gap required while addressing a left hand turn at a T intersection.

FIGS. 4 through 8 demonstrate an aspect of the new style of presentation adapted to teach a driver about safe turns while addressing a left hand turn across oncoming traffic at an uncontrolled intersection. FIG. 4 is a screen shot taken from an audio visual module that is used to demonstrate visually the six second gap that is required for safely making a left hand turn at a T intersection.

Figure 5:
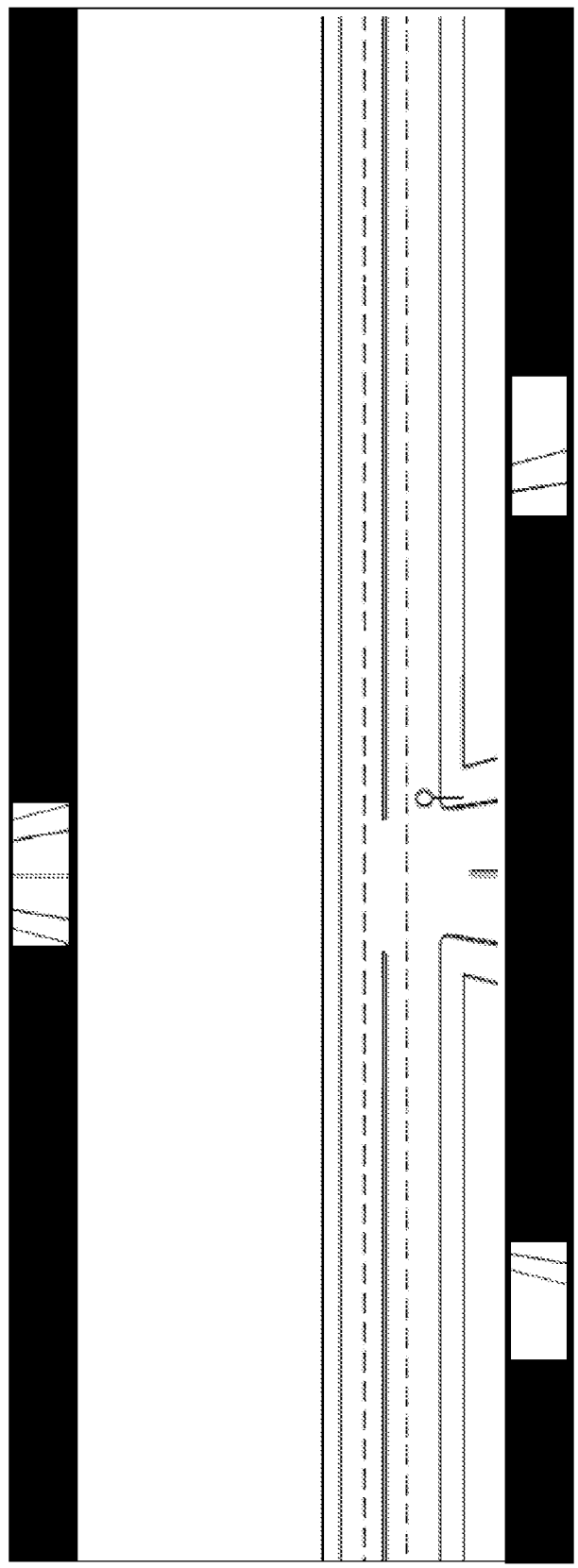
FIG. 5 shows a screen shot similar to that depicted in FIG. 3, providing a 175 degree pannable field of view, where the driving situation is associated with a safe opportunity for turning.

FIG. 5 shows a screen shot similar to that depicted in FIG. 3, providing a 175 degree pannable field of view, but in the example provided in FIG. 5, the driving situation is associated with an opportunity for turning at a T-type intersection that would be deemed safe. Within the field of view such as provided in FIG. 5, there is an opportunity to pan back and forth, to allow the driver to assess the entire driving environment for safe opportunities for turning.

Figure 6:
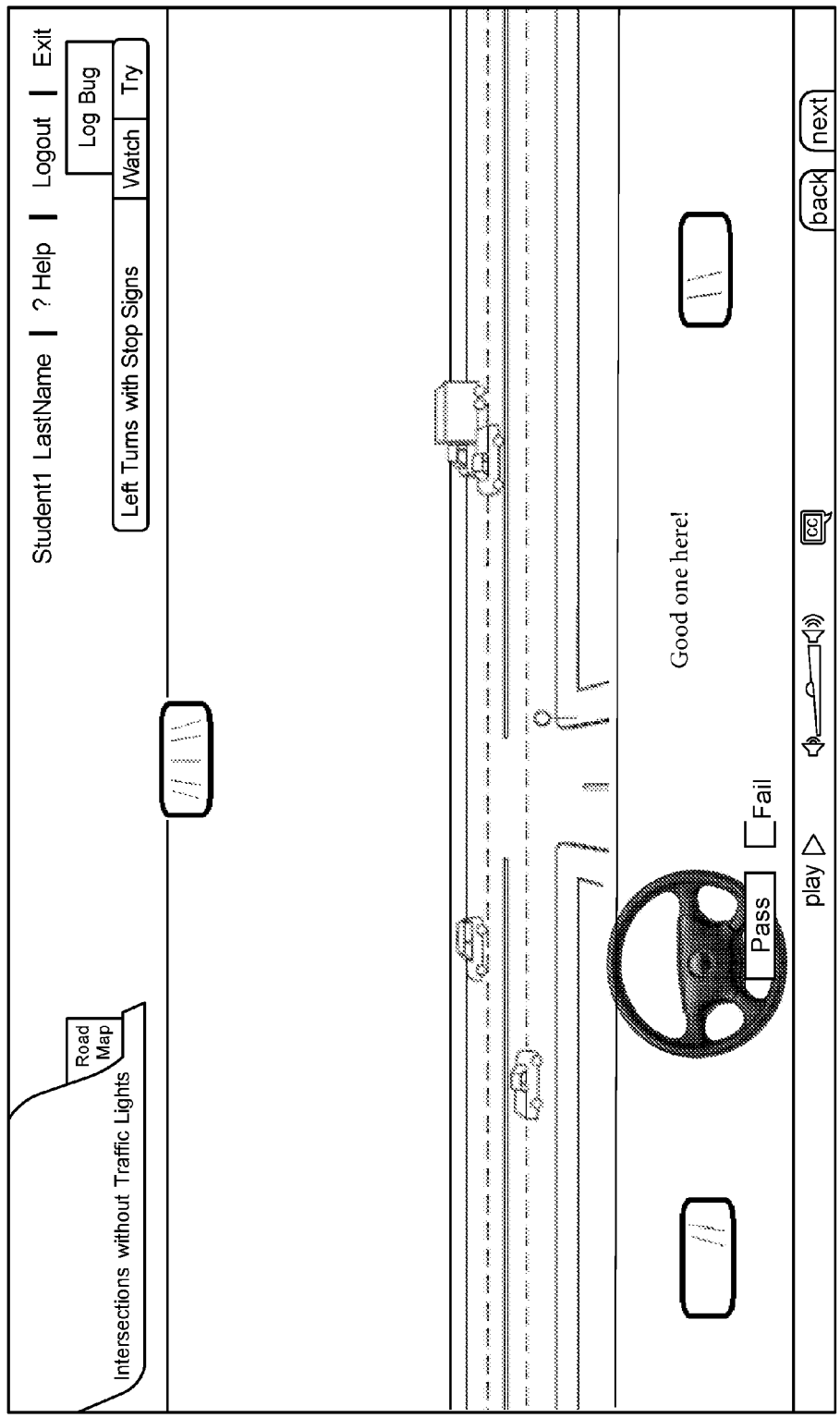
FIG. 6 is a screen shot taken from a presentation made to the driver that is from a recorded driving situation, showing a safe action.
Figure 7:
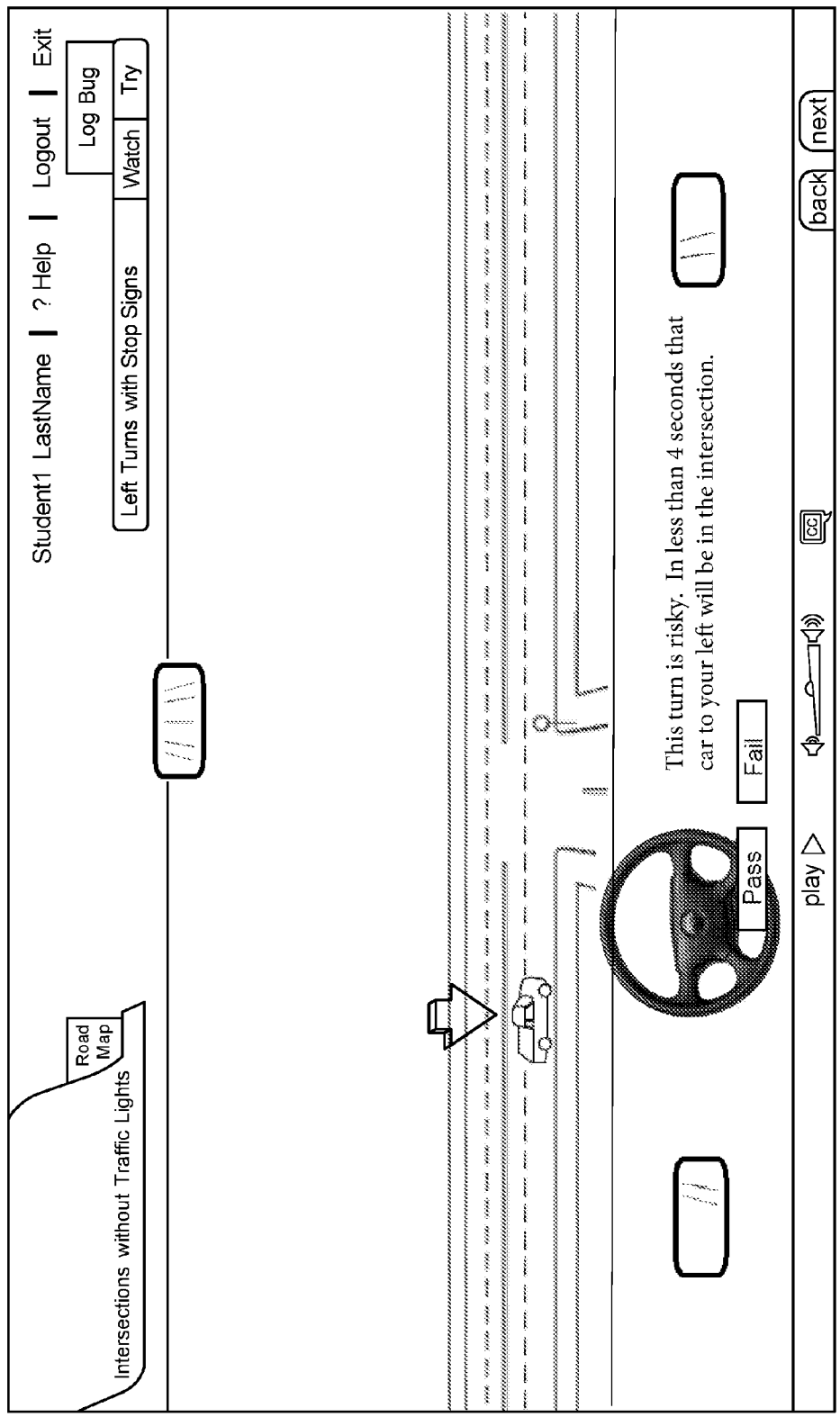
FIG. 7 is a screen shot taken from the same presentation as FIG. 4, only showing the result as a risky action.

FIGS. 6 and 7 demonstrate the pannable views available to the senior driver. FIGS. 6 and 7 are screen shots taken from a different unregulated turning situation than that in FIG. 5, and show how the presentation may be made to the driver from a recorded actual driving situation. FIGS. 6 through 7 are used in teaching the driver to accurately assess the gaps in both left and right hand oncoming traffic. The driver is presented with a pannable view of the entire intersection with traffic flowing from both the left and right directions. Gaps in the traffic are presented, and the driver must select the correct opportunities for making the left hand turn.

In assessing the results of gap analysis simulation, the time of the response is recorded and calibrated to safe, risky and unsafe scores. FIGS. 6 and 7, respectively, show screen shots demonstrating these results. For seniors, it has been determined that a score of safe requires a simulated gap of four or more seconds for taking a driver action into oncoming gaps, while a score of unsafe involves a simulated gap of less than three seconds for taking the same driver action. A risky score is assessed to an action taken through a simulated gap of between three and four seconds. The gap requirements for taking action to merge into traffic, such as a right hand turns, roundabouts, etc., is six or more seconds for taking a driver action into oncoming gaps, while a score of unsafe involves a simulated gap of less than five seconds for taking the same merging action.

The results are shown to the student, as seen in the margins of the screen shot, with scores of safe, unsafe, risky and missed all communicated immediately to the student. The system thus combines the student with actual driving situations and follows up with immediate feedback to the student regarding the appropriateness of the action taken.

In FIG. 6, the results are shown where the senior driver has made a correct determination, as the truck depicted in the figure has already passed the intersection from the right. FIG. 7 is the example of a risky turn, where the arrow to the left highlights the oncoming truck from the left that will enter the intersection in less than 4 seconds.

The driving environment presentations can be varied in complexity, such as for the traffic speed and density. The complexity may be varied within a session, or a senior driver may be advanced from sessions of lower complexity to session of higher complexity.

Figure 8:
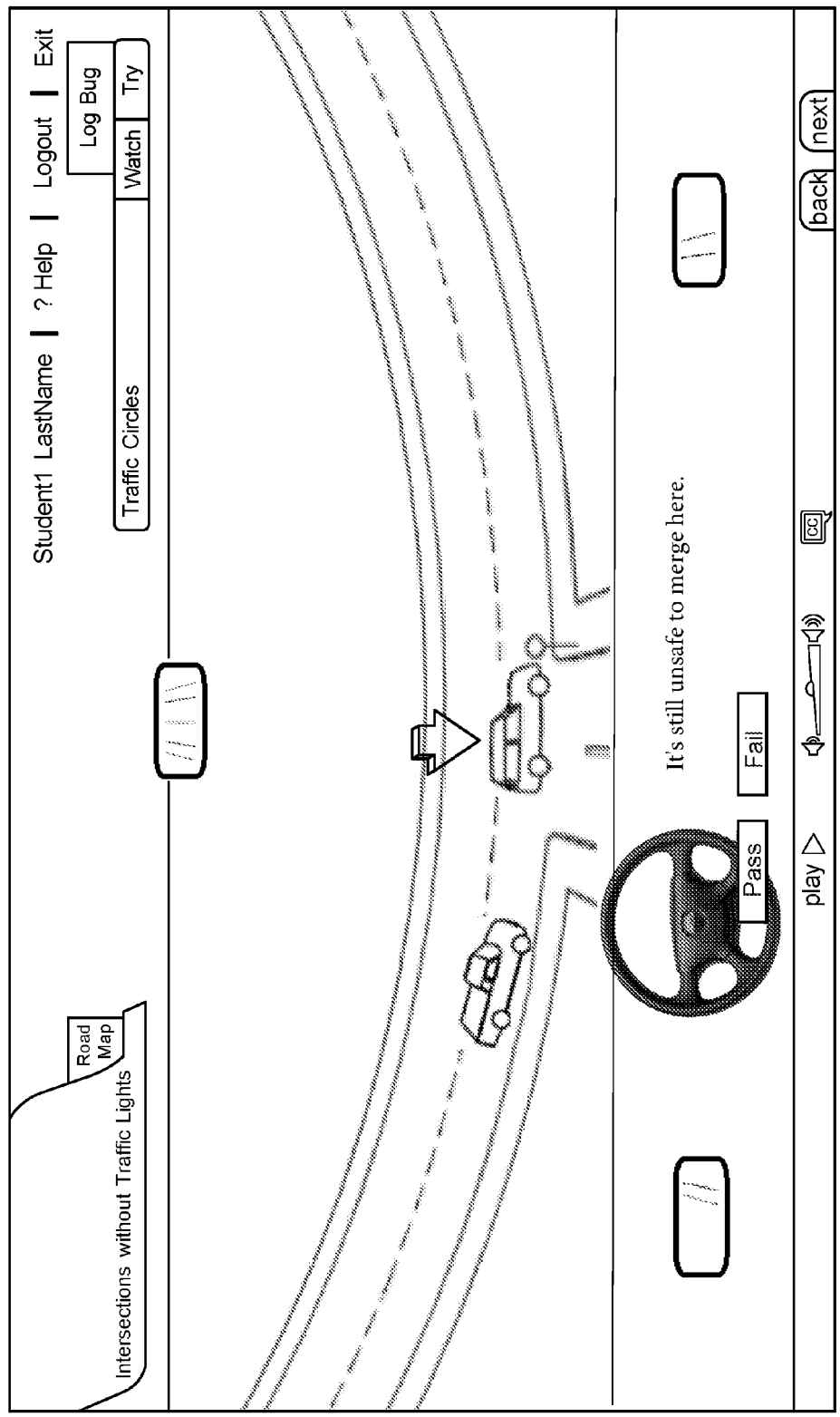
FIG. 8 is a screen shot taken from a round-about, only showing the result of an unsafe action.

FIG. 8 is a screen shot from a roundabout situation, which presents a particularly complex driving environment to navigate. As was the case for the uncontrolled intersection presentation, the result is shown in terms of the simulated action being unsafe, safe or risky actions, or the student having missed the merging opportunity. FIG. 8 demonstrates an unsafe action, as the roundabout has traffic entering from the left.

Figure 9:
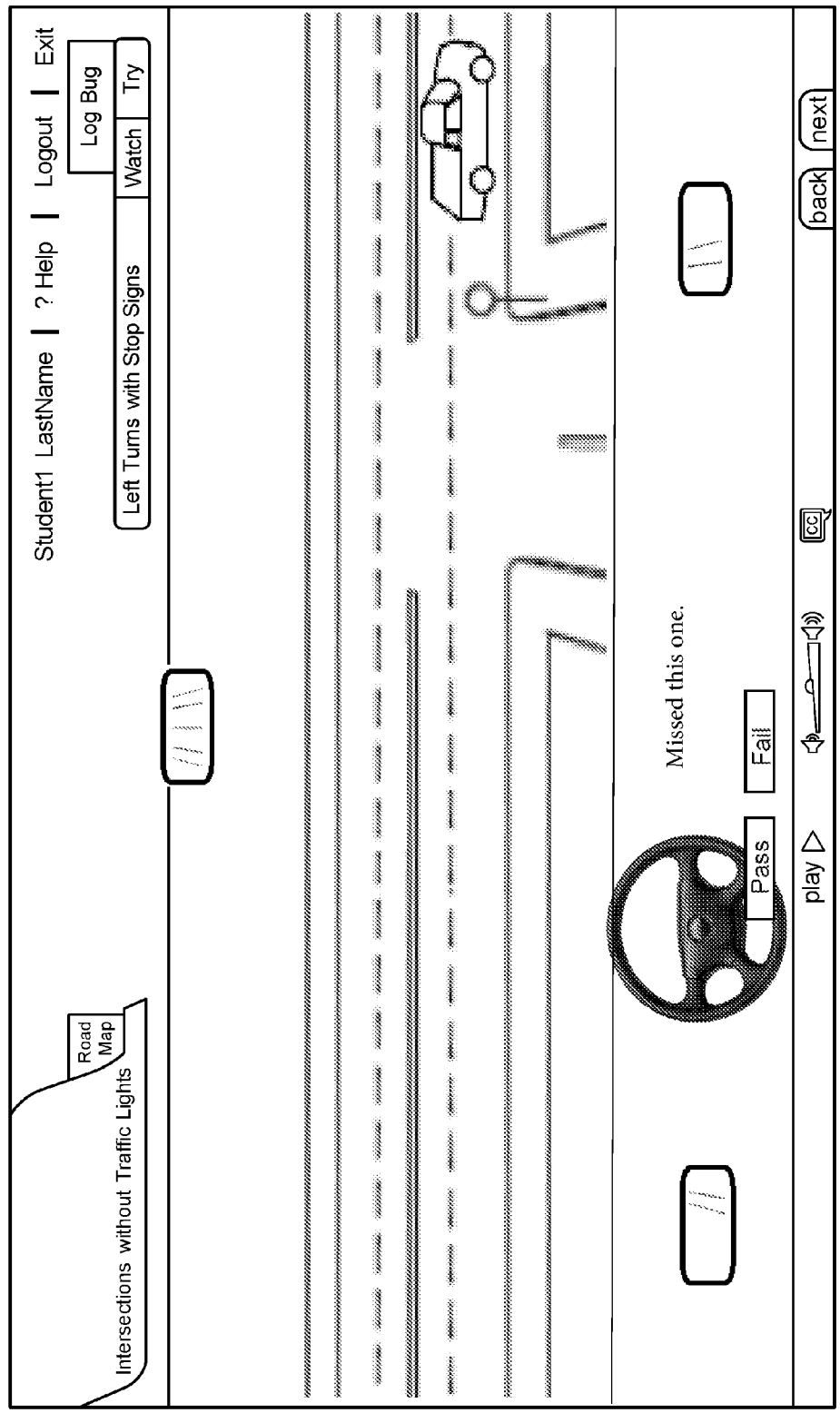
FIG. 9 is a screen shot taken from the same presentation as FIG. 4, as a missed opportunity.

Other simulated driving environments of particular concern to seniors are similarly presented. For instance, a common gap analysis issue is negotiating the gap in traffic viewed while addressing a left hand turn across oncoming traffic at an intersection controlled by a stop light. For this purpose a modified version of the system can be employed with a reduced front view that only includes a forward camera recording stitched to a view recorded from a driver's side window, since only oncoming traffic from the left is at issue. In such a case, the forward view provides a view of about 130 degrees of the driving environment within the driver's forward and left view. FIG. 9 shows such a view, where the senior driver has missed a safe opportunity to enter the intersection and complete a left-hand turn.

Figure 10:
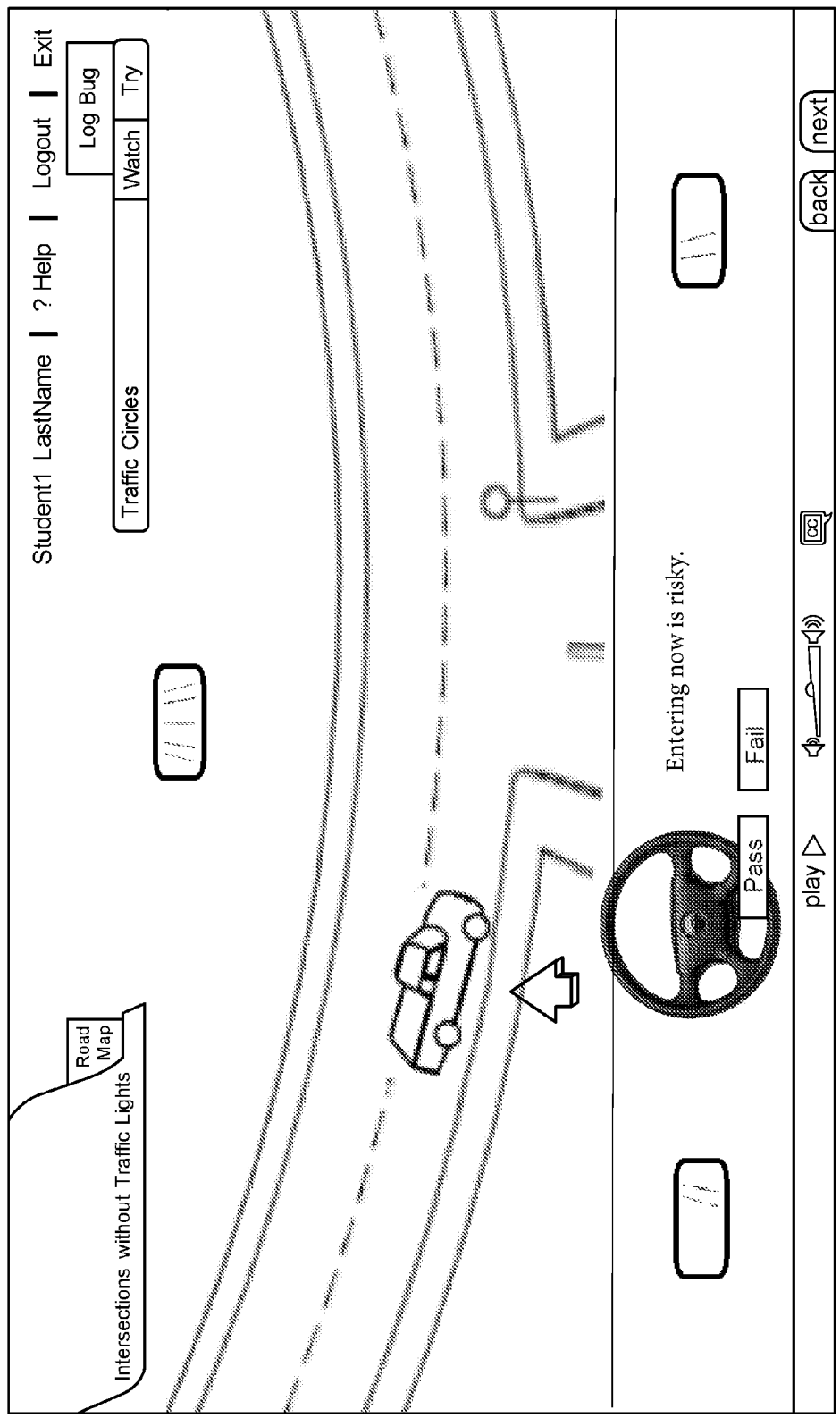
FIG. 10 is a similar presentation as shown in FIG. 4, only with the driving situation recorded from a roundabout, showing a risky action.

FIG. 10 is another view of the roundabout situation depicted in FIG. 8, only in this situation, the decision to enter is deemed risky, with the arrow used to identify the problematic car circling through the roundabout from the driver's left.

Figure 11:
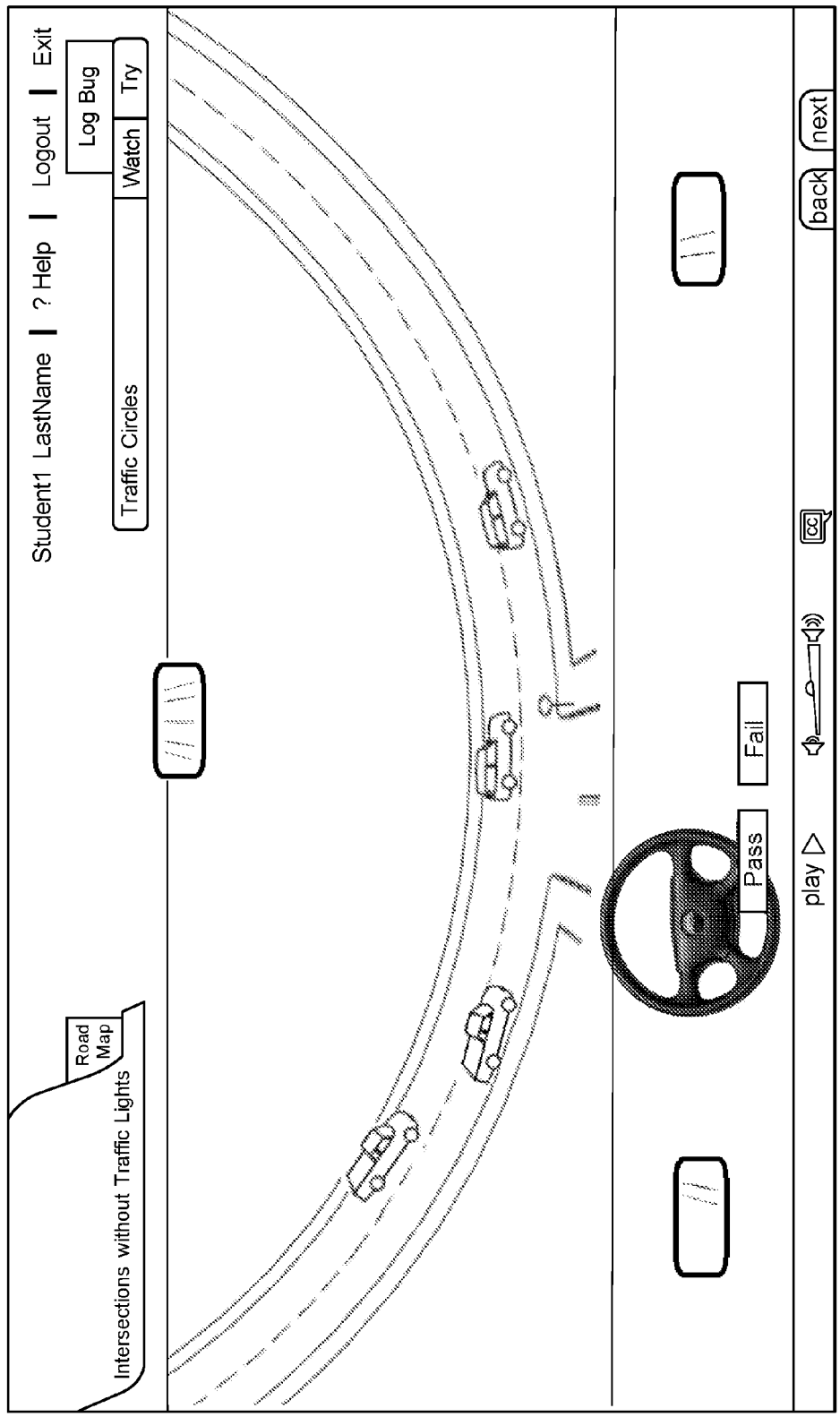
FIG. 11 is from the same presentation as shown in FIG. 8, only showing an unsafe action.

A great variety of driving situations can be provided to the senior driver, which varies in traffic speeds, densities, lighting, etc. FIG. 11 is a roundabout presentation that differs from that shown in FIG. 10, taken at a larger roundabout with faster speeds and more traffic than what is found in the circle in FIG. 10, and presenting a different level of challenge to the senior driver.

Figure 12:
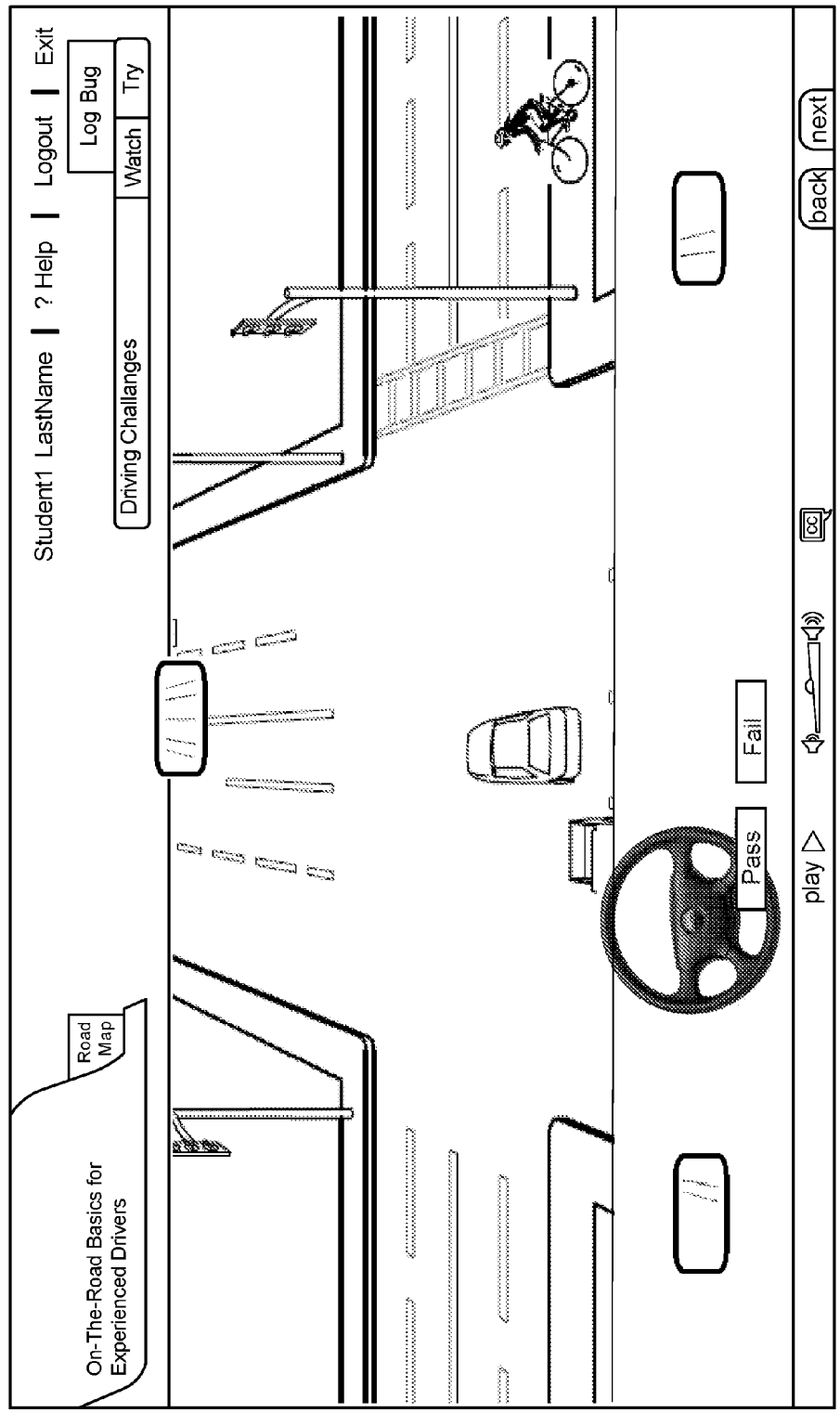
FIG. 12 is from a driving situation depicted in presentation for improving the skill of hazard detection.
Figure 13:
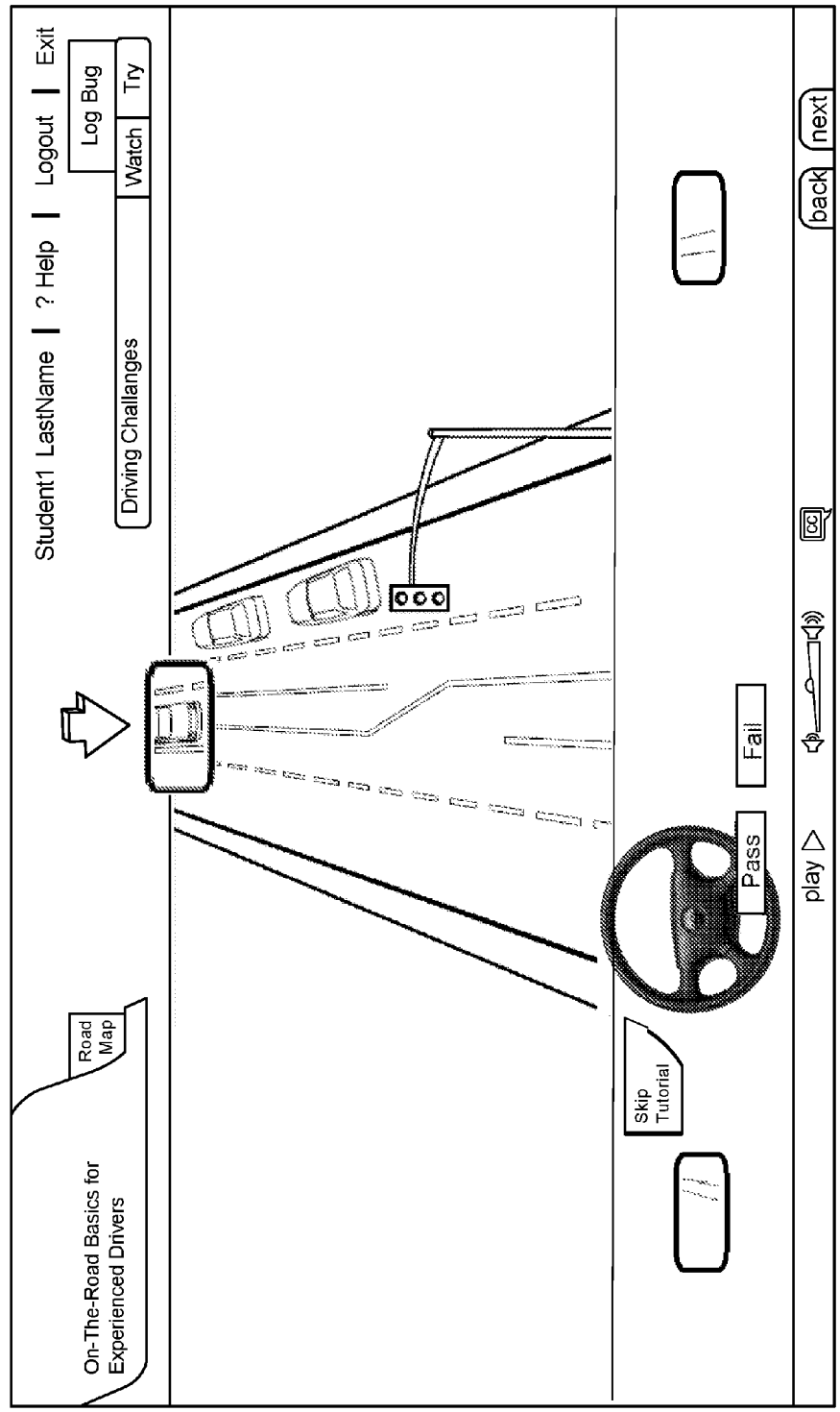
FIG. 13 shows a screen shot where the program presents a driving situation asking for a one object recall FIG. 14 driving situation calling for a two object recall FIG. 15 driving situation calling for a three object recall
Figure 14:
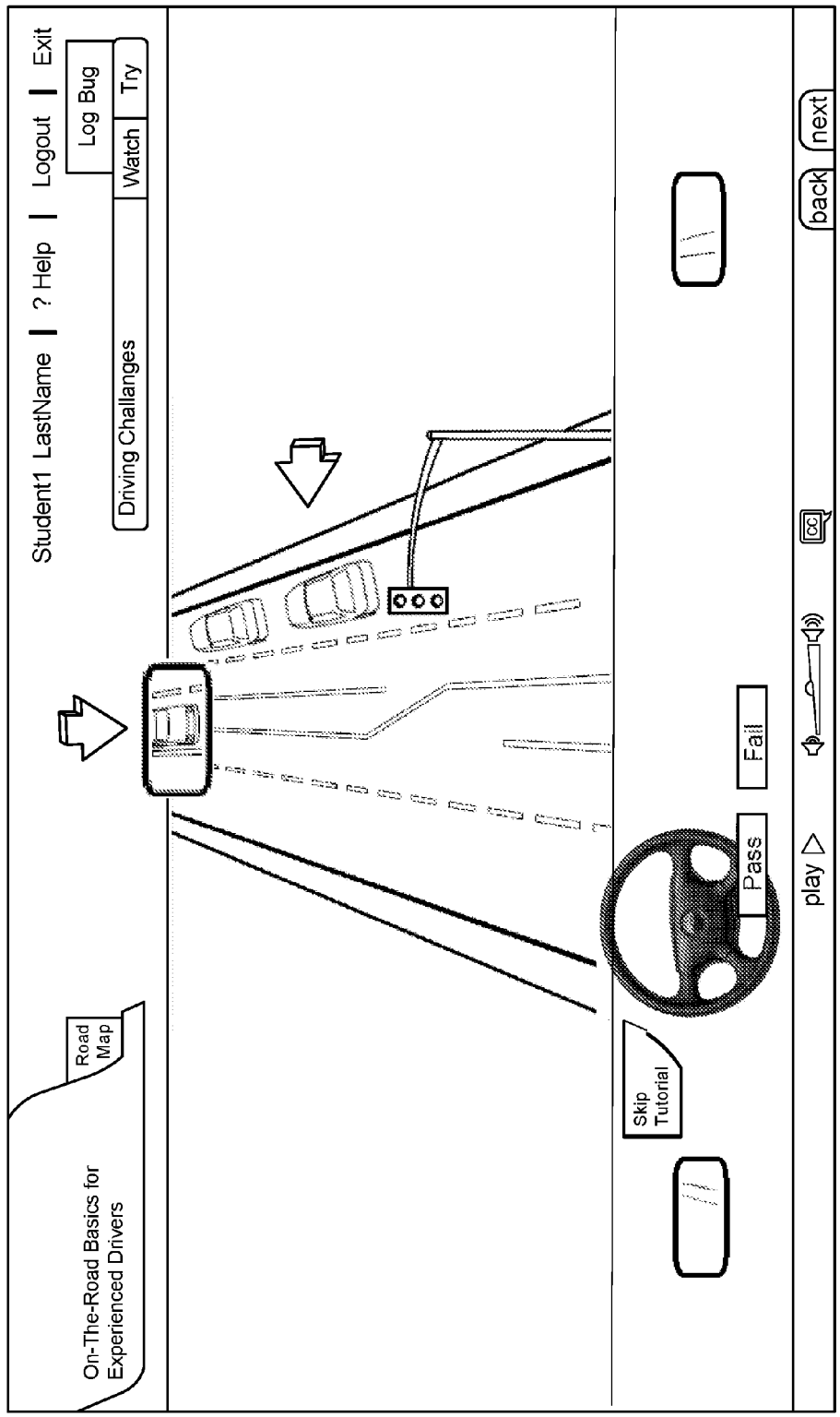

FIG. 12 is an example of a challenging driving environment that includes pedestrian and bicycle traffic at an intersection. A merge into an adjacent lane of traffic, or even onto the freeway, can be presented similarly to the other presentations. FIG. 13 provides an example of the use of the system as being particularly adapted in providing the student with an exercise in hazard detection. The screen show is taken from a presentation where driving hazards are tracked in a normal traffic flow. A truck hazard is identified in the shot shown in FIG. 13, with the arrow in the field showing the truck in the driver's rearview mirror. FIG. 14 is the same as FIG. 13, only identifying two hazards for the driver. In these types of simulations, the driver is expected to track and be able to locate the position of objects and hazards that are within the depicted driving environment.

Figure 15:
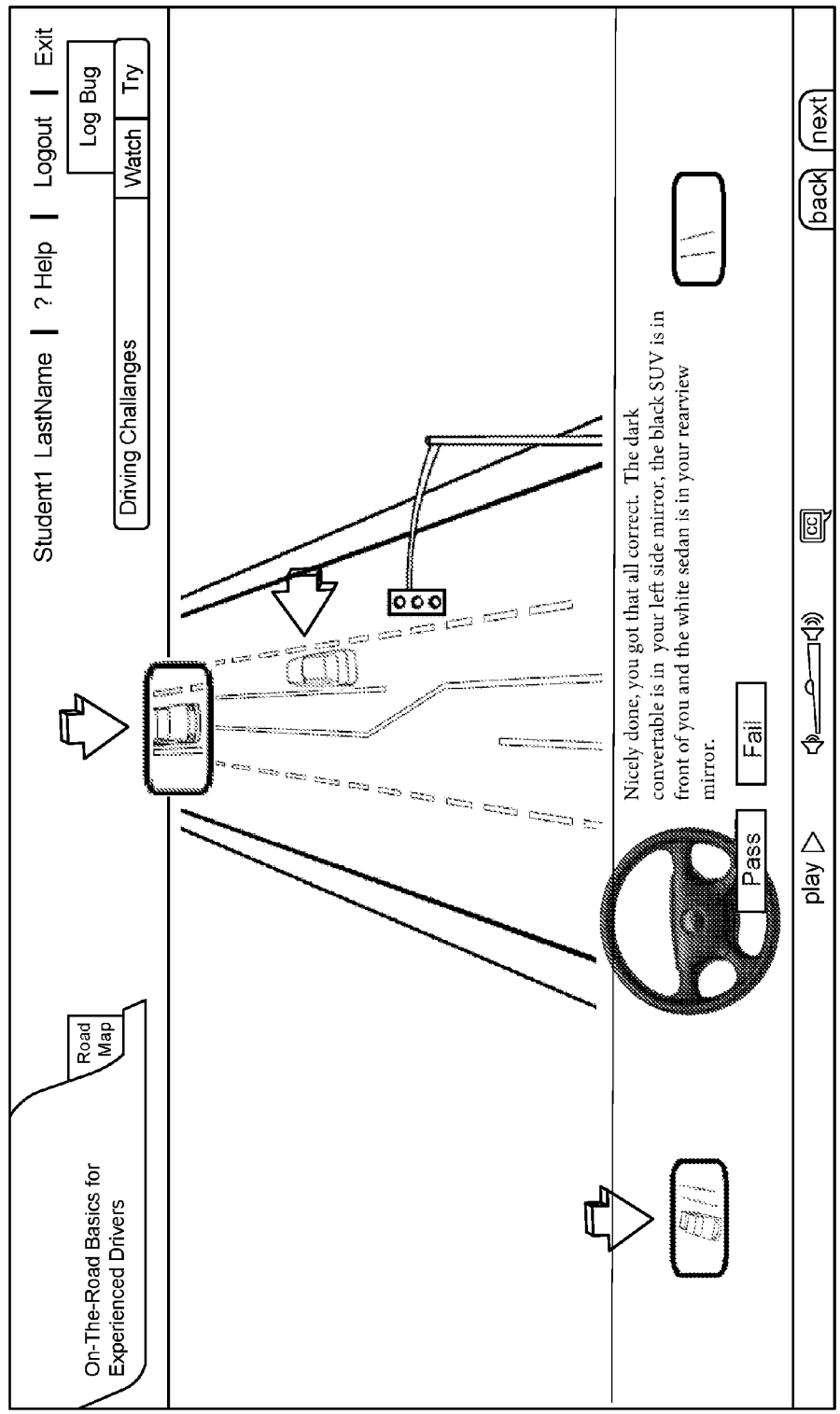

As show in FIG. 15, the hazard detection can be fairly sophisticated, and can be linked both to a general safe driving environment exercise, or in locating objects that are relevant to the decision to make a lane change. As seen in FIG. 15, the driver has correctly identified three objects in the driving environment (identified in the figure with arrows), which are also relevant to a decision to safely make a lane change of not.

Figure 16:
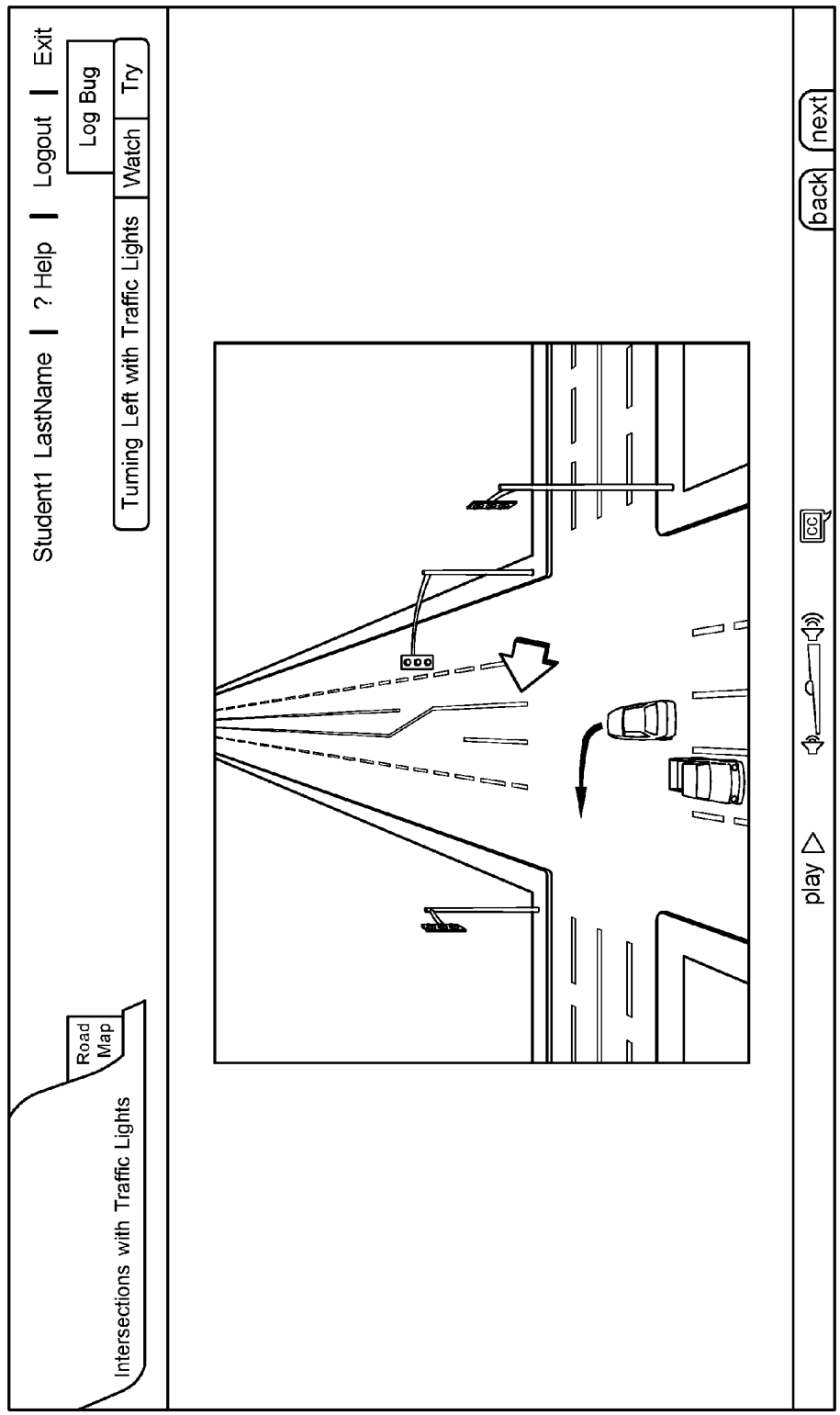
FIG. 16 is a screen shot of a module used to explain principles of safe, unsafe, and risky decisions at traffic lights according to one embodiment.
Figure 17:
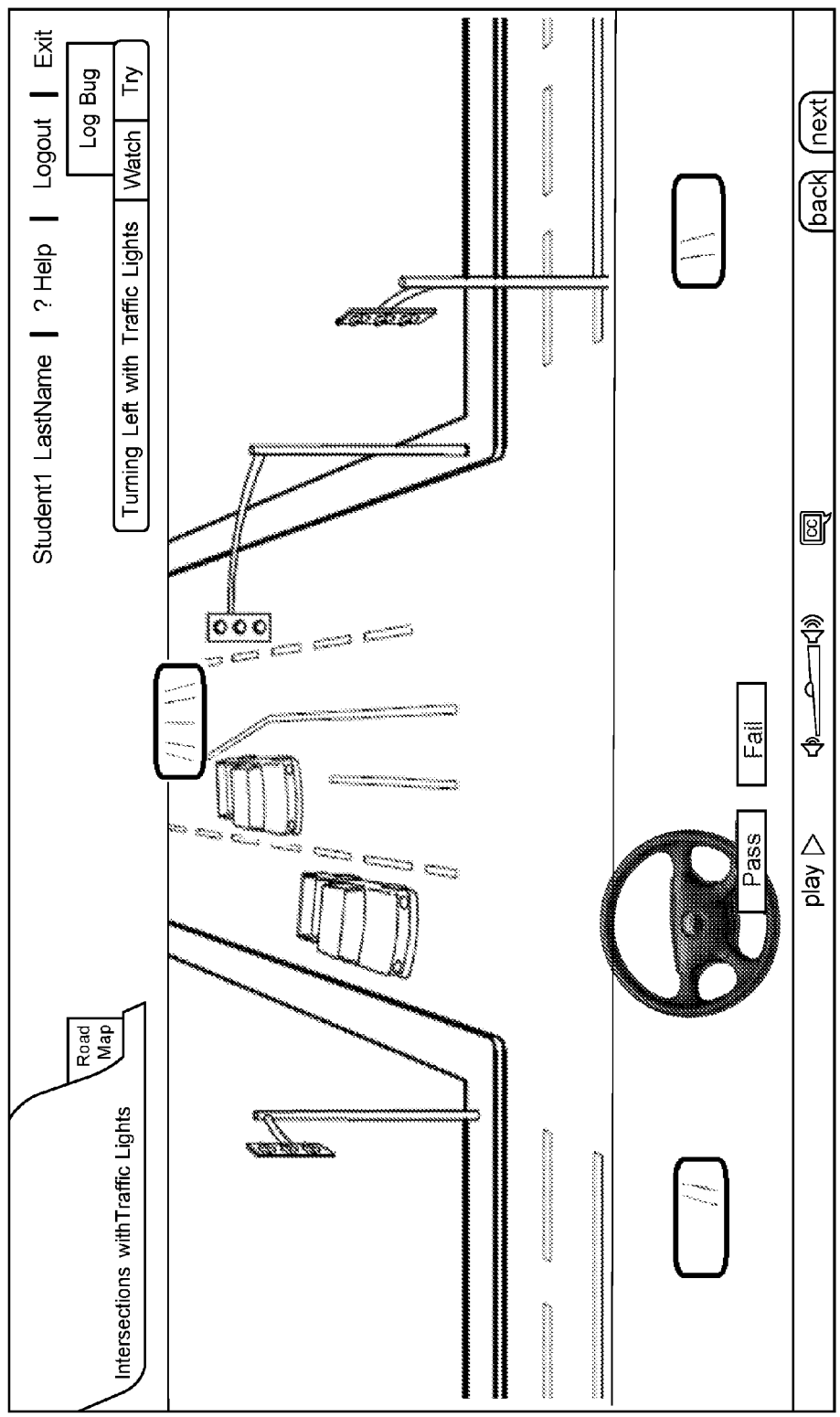
FIG. 17 is a screen shot of the driving environment presented to a senior driver attempting to make a left turn at a residential intersection according to one embodiment.
Figure 18:
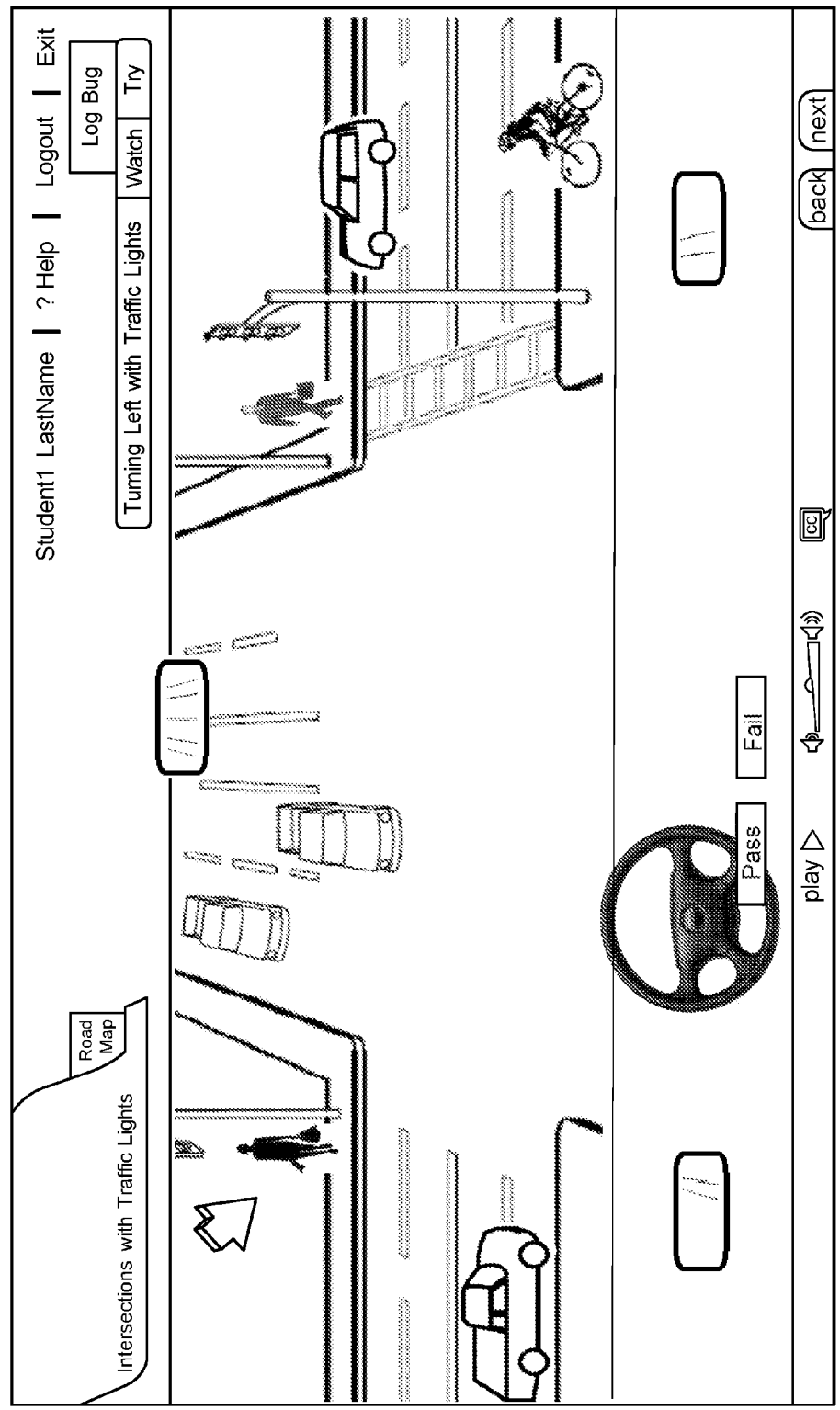
FIG. 18 is a screen shot of the driving environment presented to a senior driver attempting to make a left turn at a commercial intersection according to one embodiment.

FIGS. 16 through 18 show the applications of the system to the most difficult and dangerous of the driving situation faced by seniors, the left hand turn at a stop light across oncoming traffic. FIG. 16 is a module that is used to explain the principles of safe, unsafe and risky decisions at traffic lights.

In FIG. 17, the driving environment presented to the senior driver is a left hand turn at a traffic light in a residential area. In the environment two cars are passing through the intersection, with a gap following these two cars of some distance. The senior driver would have to make a decision to advance or not through the intersection at the coming gap. If the gap is less than 4 seconds, then the opportunity is considered risky. Even a safe gap can be deemed risky, if the driver hesitates in entering the intersection for a sufficient time to convert the safe distance to something less at the time of the decision.

FIG. 18 presents the left turn at a stop light environment at a commercial intersection, a generally busier and more challenging environment to test the senior driver. In FIG. 18, the arrow is shown identifying an additional hazard, namely, a pedestrian shopper crossing the intersection to the left.

Based on the responses to the training sessions, a training module of individualized and prescriptive instruction is developed for a particular driver, based on the diagnostic assessment and comprising at least one training lesson. Lessons presented to individual drivers are designed to aid that particular driver in the strengthening of particular driver skills or, in some cases, the development compensating abilities for the deficiencies noted in the assessment. The training sessions may include computer based training to supplement the development of skills in the areas of visual cognition, visual memory and visual recall.

As one part of the prescriptive instruction, the driver may be asked to repeat the initial training session, in order to assess rehabilitation of the driver's visual cognition, visual memory and visual recall abilities.

Information regarding successful completion of the training module can be provided to a designated third party, as evidence of the rehabilitation of the drivers skills. In one such aspect of this embodiment, a third party is selected from the group consisting of an insurance agency, a state motor vehicle agency, a police department, an automotive association and a rehabilitation center. In a further preferred embodiment, the third party is, for instance, an insurance company or agency that authorizes a discounted insurance rate for the driver in response to the evidence of rehabilitation.

In one application of the system, the information from the assessment is directed to the driver's insurance company. In the latter regard, a certification program demonstrating the completion by the driver of the tailored training regimen can be used to provide information on the successful education of the impaired driver, with training of ways to compensate and drive safely in spite of certain impairments associated with aging.

Thus, even where a senior has failed to recognize his or her own declining abilities, or where the fear of giving up driving altogether makes the senior resistant to assessment in another setting, the system provides a safe and friendly assessment with the option of a training system to advance the driving abilities. Because the system offers diagnostic and specialized training, it is possible to offer the senior an option to become trained and more proficient, in compensating for the impairments of aging, and not necessarily have to fear a permanent loss of driving ability and subsequent dependence on others for the necessities of life, or loss of social and leisure activities The system is also suitable for the many elderly drivers that may wish to monitor themselves and gradually limit or stop driving as they feel certain driving situations have become safe. With computer based training (CBT) the assessment and training can be conducted on site, such as at a state motor vehicle department facility or physician's office, or the like, or accessed through the internet for home-based training. With home based training, interactive systems can be installed to monitor progress and report diagnostic test results to insurance agencies, motor vehicle departments, or other interested parties. With repeated tests, the improvement in driving abilities, or continued decline, can be monitored over time, so that both the extent of, and trend in, the impairment can be continuously assessed, and remedial actions taken as appropriate.

With the assessment and training method described herein, the question of whether and to what extent an impaired driver may be required give up the driving privilege can be answered privately, or only between the senior and limited family members or third parties of the seniors choosing.

Additionally, the system provides the opportunity for a training regimen tailored to the particular needs of a driver, and thus holds out the promise of eventual improvement and certification of safe driving skills. As one example, the National Highway Traffic Safety Administration suggests various ways that seniors can adapt to their changing abilities. If drivers often seem to suddenly stop in front of the senior, they are advised to pay extra attention to vehicles in front and maintain a safe distance between cars: one car length for every 10 miles per hour. If other drivers seem to be going especially fast to the senior, use the speed limit as a guide. The senior is urged to not feel pressured to drive unnecessarily fast, but to recognize that going too slowly can be just as dangerous. They are also urged to stay in the right-hand lane where they can.

As another example, they may be urged to stay in the middle lane when safe and in the right-hand lane when exiting freeways or turning right when they can.

If sharp turns are difficult for the senior to make, a recommendation is typically made to go as slowly as is needed and stay in the lane, using the signal and being sure its off after completing the turn.

If highway driving gives the senior more trouble than he or she is used to, the senior is asked to remember to stay in the lane that's going closest to their own speed, and keep up with the rest of traffic as best they can. Avoiding traveling during rush hour is also recommended, as well as avoiding night time driving and bad weather conditions. Other recommendations include reducing distance traveled, and even making three right turns instead of turning left, if needed.

These and other suggestions can aid the senior in driving safely with advancing age. However, the method described herein allows the rehabilitation and training that is very specifically targeted to that driver, with the aim of improving the seniors driving skills, particularly as regards to the skills involved in hazard detection and visual cognition. These skills can be trained, and are among the most likely skills to prevent accidents.

Aspects of the present invention may be implemented using hardware, software, firmware, or a combination thereof and may be implemented in one or more computer systems or other processing systems.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention.

What is claimed is:

1. A driving simulator for assessing and improving driving skills of a senior driver comprising:
    a computerized audio/visual device programmed to:
    display an interactive driving simulation presented through four active visual zones from a driver's-seat perspective comprising (1) a driver's forward view, (2) a rear mirror view, (3) a left side minor view, and (4) a right side mirror view, wherein the driver's forward view includes stitched video from a first camera that recorded a driver's side window view, a second camera that recorded a windshield view, and a third camera that recorded a passenger's window, and wherein the rear minor view, left side mirror view, and right side mirror view each simultaneously depict a scene recorded simultaneously with the driver's forward view;
    display movement of a plurality of objects moving from one of the four active visual zones to one of two inactive zones representing a left blind spot and a right blind spot;
    track the movement of the plurality of objects into the one of the two inactive zones;
    stop the interactive driving simulation after one of the plurality of objects moves into the one of the two inactive zones;
    display a top-down-perspective graphic six zone screen, wherein each zone of the six zone screen represents the driver's forward view, the rear minor view, the left side mirror view, the right side minor view, the left blind spot, and the right blind spot respectively;
    display a prompt to the senior driver to identify the one of the plurality of objects that is in the one of the two inactive zones at the time the interactive driving simulation was stopped;
    determine if the senior driver's response to the prompt was correct; and
    determine the senior driver's response time to the prompt.

2. The driving simulator of claim 1 wherein the computerized audio/visual device is programmed to:
    record whether the senior driver's response was correct;
    record the senior driver's response time;
    create a database for storing whether the senior driver's response was correct and the senior driver response time;
    store whether the senior driver's response was correct and the senior driver's response time; and
    analyze whether the senior driver's response was correct and the senior driver's response time to develop a diagnostic assessment of impairments in the visual cognition, visual memory, or visual recall abilities of the senior driver.

3. The driving simulator of claim 1 wherein the interactive driving simulation is presented using digital frame based technology.

4. The driving simulator of claim 1 wherein the forward view provides a view of at least about 180 degrees.

5. The driving simulator of claim 1 wherein the computerized audio/visual device is programmed to assess the senior driver's visual search skills, visual memory, and visual recall.

6. A computerized audio/visual driving simulator method for assessing and improving driving skills of a senior driver comprising:
    a) displaying an interactive driving simulation presented through four active visual zones from a driver's-seat perspective comprising a driver's forward view, rear mirror view, left side minor view, and right side minor view, wherein the driver's forward view includes stitched video from a first camera that recorded a driver's side window view, a second camera that recorded a windshield view, and a third camera that recorded a passenger's window, and wherein the rear mirror view, left side mirror view, and right side mirror view each simultaneously depict a scene recorded simultaneously with the driver's forward view;
    b) displaying movement of a plurality of objects moving from one or more of the four active visual zones to one or more of two inactive zones representing a left blind spot and a right blind spot;
    c) tracking the movement of the plurality of objects into the one or more of the two inactive zones;
    d) stopping the interactive driving simulation after one of the plurality of objects moves into the one or more of the two inactive zones;
    e) displaying a top-down-perspective graphic multi zone screen;
    f) displaying a prompt to the senior driver to identify the one of the plurality of objects that is in the one or more of the two inactive zones at the time the interactive driving simulation was stopped;
    g) determining if the senior driver's response to the prompt was correct; and
    h) determining the senior driver's response time to the prompt.

7. The method of claim 6 further comprising the steps of:
    f) recording whether the senior driver's response was correct and the trainee response time;
    g) creating a database for storing whether the senior driver's response was correct and the senior driver's response time;
    h) storing whether the senior driver's response was correct and the senior driver's response time; and
    i) analyzing whether the senior driver's response was correct and the senior driver's response time to develop a diagnostic assessment of impairments in the visual cognition, visual memory, and/or visual recall abilities of the senior driver.

8. The method of claim 6 wherein the interactive driving simulation is presented using digital frame based technology.

9. The method of claim 6 comprising assessing the senior driver's visual search skills, visual memory, and visual recall.

10. The method of claim 6 wherein the forward view provides a view of at least about 180 degrees.

11. A computer-implemented method for assessing and improving driving skills of a senior driver comprising:
    displaying an interactive driving simulation presented through four active visual zones from a driver's-seat perspective comprising a driver's forward view, rear minor view, left side minor view, and right side minor view, wherein the driver's forward view includes stitched video from a first camera that recorded a driver's side window view, a second camera that recorded a windshield view, and a third camera that recorded a passenger's window, and wherein the rear mirror view, left side mirror view, and right side mirror view each simultaneously depict a scene recorded simultaneously with the driver's forward view;

displaying movement of a plurality of objects moving from one of the four active visual zones to one of two inactive zones representing a left blind spot and a right blind spot;

tracking the movement of the plurality of objects into the one of the two inactive zones;

stopping the interactive driving simulation after one of the plurality of objects moves into the one of the two inactive zones;

displaying a top-down-perspective graphic six zone screen, wherein each zone of the six zone screen represents the driver's forward view, the rear minor view, the left side mirror view, the right side minor view, the left blind spot, and the right blind spot respectively;

displaying a prompt to the senior driver to identify the one of the plurality of objects that is in the one of the two inactive zones at the time the interactive driving simulation was stopped;

determining if the senior driver's response to the prompt was correct; and determining the senior driver's response time to the prompt.

12. The method of claim 11 further comprising:

recording whether the senior driver's response was correct and the senior driver's response time;

creating a database for storing whether the senior driver's response was correct and the senior driver's response time;

storing whether the senior driver's response was correct and the senior driver's response time; and analyzing whether the senior driver's response was correct and the senior driver's response time to develop a diagnostic assessment of impairments in the visual cognition, visual memory, and visual recall abilities of the senior driver.

* * * * *